(12) United States Patent
Kim et al.

(10) Patent No.: US 11,181,790 B2
(45) Date of Patent: Nov. 23, 2021

(54) LIQUID CRYSTAL DISPLAY DEVICE

(71) Applicant: LG Display Co., Ltd., Seoul (KR)

(72) Inventors: Chang-Eun Kim, Paju-si (KR); Sung-Hee Kim, Paju-si (KR); Su-Jeong Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/090,799

(22) Filed: Nov. 5, 2020

(65) Prior Publication Data

US 2021/0141276 A1   May 13, 2021

(30) Foreign Application Priority Data

Nov. 11, 2019   (KR) .................. 10-2019-0143396

(51) Int. Cl.
*G02F 1/1362* (2006.01)
*G02F 1/1333* (2006.01)
*G02F 1/1339* (2006.01)
*G02F 1/1335* (2006.01)
*G02F 1/1368* (2006.01)

(52) U.S. Cl.
CPC ...... *G02F 1/136204* (2013.01); *G02F 1/1368* (2013.01); *G02F 1/13338* (2013.01); *G02F 1/13394* (2013.01); *G02F 1/133528* (2013.01); *G02F 1/136222* (2021.01)

(58) Field of Classification Search
CPC .......... G02F 1/136204; G02F 1/13338; G02F 1/133528; G02F 1/13394; G02F 1/1368; G02F 1/136222

USPC .......................................................... 349/12
See application file for complete search history.

(56) References Cited

U.S. PATENT DOCUMENTS

| 8,704,962 B2 | 4/2014 | Oh et al. |
| 9,600,109 B2 | 3/2017 | Oh et al. |
| 9,727,158 B2 | 8/2017 | Oh et al. |

(Continued)

FOREIGN PATENT DOCUMENTS

| KR | 10-2011-0105652 A | 9/2011 |
| KR | 10-2011-0105654 A | 9/2011 |
| TW | I636390 B | 9/2018 |

OTHER PUBLICATIONS

Taiwan Intellectual Property Office, Office Action, TW Patent Application No. 109139350, dated Aug. 30, 2021, 12 pages.

*Primary Examiner* — Charles S Chang
(74) *Attorney, Agent, or Firm* — Fenwick & West LLP

(57) ABSTRACT

A liquid crystal display device is disclosed. The device may include an array substrate including a first substrate, which is placed adjacent to a backlight, and a thin film transistor and a touch electrode, which are provided on the first substrate, and an opposite substrate including a second substrate, which faces the first substrate with a liquid crystal layer interposed therebetween, and a static electricity prevention layer, which is deposited on an outer surface of the second substrate. The static electricity prevention layer is formed of a host material containing at least one of $In_2O_3$ and $SnO_2$ and a dopant material containing at least one of $SiO_2$, $ZrO_2$, $HfO_2$, $Nb_2O_5$, and $Ta_2O_5$ and has sheet resistance of about $10^{6.5}$ Ω/sq to about $10^9$ Ω/sq.

23 Claims, 20 Drawing Sheets

(56) References Cited

U.S. PATENT DOCUMENTS

| | | | |
|---|---|---|---|
| 10,620,729 B2 | 4/2020 | Oh et al. | |
| 2011/0227851 A1 | 9/2011 | Oh et al. | |
| 2011/0228188 A1* | 9/2011 | Kim | G02F 1/13338 |
| | | | 349/43 |
| 2011/0228189 A1 | 9/2011 | Oh et al. | |
| 2017/0023835 A1 | 1/2017 | Oh et al. | |
| 2017/0300156 A1 | 10/2017 | Oh et al. | |
| 2018/0252955 A1* | 9/2018 | Kurasawa | G06F 3/0412 |
| 2019/0162996 A1* | 5/2019 | Tominaga | G02F 1/1337 |
| 2019/0319051 A1 | 10/2019 | Lin et al. | |
| 2020/0057521 A1* | 2/2020 | Lee | G02F 1/133512 |
| 2020/0201469 A1 | 6/2020 | Oh et al. | |
| 2020/0257338 A1* | 8/2020 | Park | G06F 1/1626 |

\* cited by examiner

LIQUID CRYSTAL DISPLAY DEVICE

CROSS-REFERENCE TO RELATED APPLICATIONS

The present application claims the priority benefit of Republic of Korea Patent Application No. 10-2019-0143396 filed in Republic of Korea on Nov. 11, 2019, which is hereby incorporated by reference in its entirety for all purposes as if fully set forth herein.

BACKGROUND

Field

The present disclosure relates to a liquid crystal display (LCD) device, and in particular, to a touch LCD device.

Discussion of the Related Art

With the rapid transition to the information society, demands for display devices of displaying images are increasing in various forms, and recently, various flat display devices, such as liquid crystal display (LCD), plasma display panel (PDP), and organic light emitting diode (OLED) devices, are being used in various fields.

The LCD device, one of the flat display devices, has technical advantages, such as small size, light weight, thin thickness, and low power consumption, and is widely used for many applications.

Recently, a touch sensing function is increasingly required for various information display electronic devices, such as laptop computers or smart phones, and thus, a touch sensor is applied to the LCD devices. In particular, an in-cell type touch LCD device, in which a liquid crystal panel equipped with the touch sensor is provided, is being widely used.

In general, the conventional in-cell type touch LCD device is configured to have an inverted panel structure. In the inverted panel structure, an array substrate is disposed adjacent to a display surface, to which a touch event is input, whereas an opposite substrate, which is opposite to the array substrate, is disposed at a lower portion of the LCD device. A transparent conductive layer is formed on an outer surface of the opposite substrate so as to prevent static electricity in an auto-probe test step, and a polarizing plate with a static electricity prevention layer is attached to an outer surface of the array substrate for touch sensing and static electricity prevention. Furthermore, in the inverted panel structure, an inorganic insulating layer is additionally formed so as to prevent a user from recognizing reflection by a gate metal.

For the touch LCD device of the conventional inverted panel structure, it is necessary to form the additional inorganic insulating layer and to prepare a highly expensive polarizing plate with a static electricity prevention function and an additional apparatus for inverting the panel. Accordingly, there are problems, such as low productivity and high fabrication cost, in the conventional touch LCD device.

SUMMARY

Accordingly, the present disclosure is directed to an LCD device that substantially obviates one or more of the problems due to limitations and disadvantages of the related art.

An object of the present disclosure is to provide a touch LCD device that can effectively realize an increase of productivity and a reduction in fabrication cost.

Additional features and advantages of the disclosure will be set forth in the description which follows, and in part will be apparent from the description, or may be learned by practice of the disclosure. The advantages of the disclosure will be realized and attained by the structure particularly pointed out in the written description and claims as well as the appended drawings.

To achieve these and other advantages, and in accordance with the purpose of the present disclosure, as embodied and broadly described herein, a liquid crystal display device includes an array substrate including a first substrate, which is placed adjacent to a backlight, and a thin film transistor and a touch electrode which are provided on the first substrate, and an opposite substrate including a second substrate, which faces the first substrate with a liquid crystal layer interposed therebetween, and a static electricity prevention layer which is deposited on an outer surface of the second substrate, wherein the static electricity prevention layer is formed of a host material containing at least one of $In_2O_3$ and $SnO_2$ and a dopant material containing at least one of $SiO_2$, $ZrO_2$, $HfO_2$, $Nb_2O_5$, and $Ta_2O_5$ and has sheet resistance of about $10^{6.5}$ $\Omega$/sq to about $10^9$ $\Omega$/sq.

In another aspect, a method of fabricating a liquid crystal display device includes fabricating an array substrate including a first substrate, which is placed adjacent to a backlight, and a thin film transistor and a touch electrode which are provided on the first substrate, and fabricating an opposite substrate including a second substrate, which faces the first substrate with a liquid crystal layer interposed therebetween, and a static electricity prevention layer which is deposited on an outer surface of the second substrate, wherein the static electricity prevention layer is formed of a host material containing at least one of $In_2O_3$ and $SnO_2$ and a dopant material containing at least one of $SiO_2$, $ZrO_2$, $HfO_2$, $Nb_2O_5$, and $Ta_2O_5$ and has sheet resistance of about $10^{6.5}$ $\Omega$/sq to about $10^9$ $\Omega$/sq.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Reference will now be made in detail to embodiments, examples of which are illustrated in the accompanying drawings. The same or like reference numbers may be used throughout the drawings to refer to the same or like parts.

A touch LCD device according to the present disclosure may have an in-cell structure, in which a touch sensor is provided in a liquid crystal panel, and may be operated in all kinds of capacitive touch sensing manners (e.g., the self-capacitive and mutual-capacitive sensing manners).

In the embodiments to be described below, a touch LCD device operated in the self-capacitive method will be described by way of example, for concise description.

Figure 1:
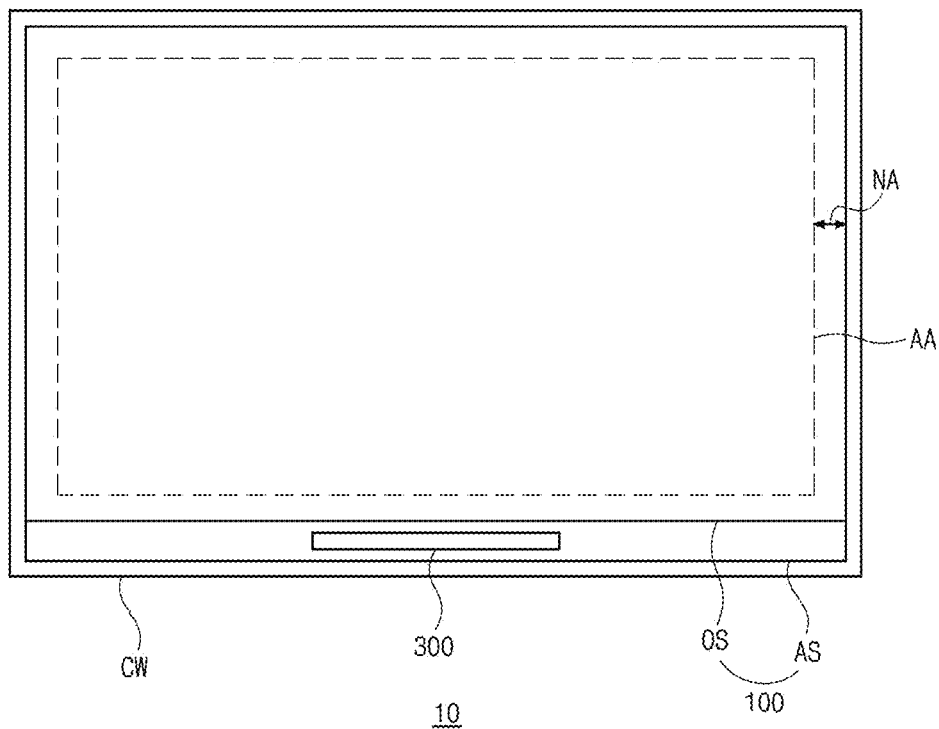
FIG. 1 is a plan view schematically illustrating a touch LCD device according to an embodiment of the present disclosure.
Figure 2:
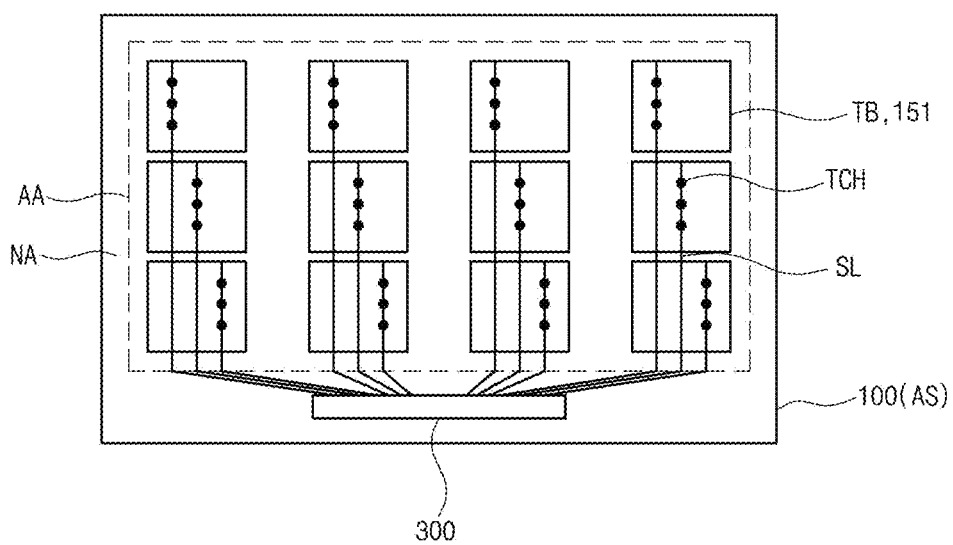
FIG. 2 is a plan view schematically illustrating a liquid crystal panel according to an embodiment of the present disclosure.

FIG. 1 is a plan view schematically illustrating a touch LCD device according to an embodiment of the present disclosure, and FIG. 2 is a plan view schematically illustrating a liquid crystal panel according to an embodiment of the present disclosure.

Referring to FIGS. 1 and 2, a touch LCD device 10 according to the present embodiment may include a liquid crystal panel 100, which is configured to display an image and is provided with a touch device, and a cover window CW, which is attached to a front surface of the liquid crystal panel 100 serving as an image display surface, in short a display surface.

Although not illustrated in detail, a back-light unit may be disposed below the liquid crystal panel 100 to provide light to the liquid crystal panel 100.

An edge-type back-light unit, in which a light source (e.g., a light emitting diode (LED)) is disposed adjacent to the liquid crystal panel 100 in a lateral direction, or a direct-type back-light unit, in which the light source is disposed below the liquid crystal panel 100, may be used as the back-light unit.

In the present embodiment, the liquid crystal panel 100 may have an in-cell structure, in which a touch electrode 151, one of self-capacitive touch devices, is provided in the panel. For example, the touch electrode 151 may be disposed in one of two substrates AS and OS of the liquid crystal panel 100.

In the liquid crystal panel 100 of the in-cell structure, the touch electrode 151 having a touch sensing function may be applied with a common voltage during an image display period of the liquid crystal panel 100, thereby serving as a common electrode 151. The touch electrode 151 may be applied with a touch driving signal during a touch sensing period between the image display periods, and in this case, the touch electrode 151 may be used as a touch sensing electrode.

The liquid crystal panel 100 of the in-cell structure may include an array substrate AS, which is provided adjacent to the back-light unit to serve as a lower substrate, an opposite substrate OS, which is provided adjacent to the image display surface to serve as an upper substrate opposite to the array substrate AS, and a liquid crystal layer, which is provided between the array substrate AS and the opposite substrate OS.

In an embodiment, the liquid crystal panel 100 may be configured to have the array substrate AS, in which a pixel electrode and the touch electrode 151 (i.e., the common electrode 151) are formed as electrodes that are used to produce an electric field for driving the liquid crystal layer.

For example, a liquid crystal panel, which is operated in an in-plane switching (IPS) or advanced high performance IPS (AH-IPS) manner, may be used as the liquid crystal panel 100. In the present embodiment, a liquid crystal panel, which is operated in the AH-IPS mode to produce a fringe field, will be referred to as an example of the liquid crystal panel 100, for concise description.

The liquid crystal panel 100 may include a display region AA, which is used to display an image, and a non-display region NA, which is provided adjacent to the display region AA. The display region AA may include a plurality of pixel regions, which are disposed in a row direction and a column direction to form a matrix-shaped arrangement.

A plurality of touch blocks TB may be disposed in the liquid crystal panel 100 and, in an embodiment, the touch blocks TB may be disposed in the row direction and the column direction to form a matrix-shaped arrangement. Each of the touch blocks TB may be constituted by a plurality of pixel regions as a unit group, which are adjacent to each other in the row direction and the column direction.

In the array substrate AS of the liquid crystal panel 100, the touch electrode 151 (i.e., the common electrode 151) may be patterned and formed in each of the touch blocks TB by a patterning process.

The common electrodes 151, which are respectively provided in adjacent ones of the touch blocks TB, may be physically spaced apart from each other, and thus, the common electrode 151 in each touch block TB may be provided as an isolated pattern.

Accordingly, the common electrodes 151, which are provided in adjacent ones of the touch blocks TB, may be electrically disconnected from each other, and thus, the touch block TB may be operated in a separate or independent manner.

Touch lines SL extending in a specific direction may be formed in the array substrate AS of the liquid crystal panel 100 and may be connected to the touch blocks TB, respectively. For example, the touch line SL may be formed parallel to the column direction or a vertical direction, which is an extension direction of a data line.

Each of the touch lines SL may be connected to the common electrode 151 in corresponding one of the touch blocks TB through a contact hole TCH, which is formed in the corresponding touch block TB, and may be used to deliver a driving signal to the common electrode 151.

During the image display period (e.g., each frame), a common voltage may be applied to the common electrode 151 through the touch line SL. Thus, in each pixel region in the touch block TB, an electric field may be produced between the pixel electrode and the common electrode 151, and such an electric field may be controlled to drive the liquid crystal layer and thereby to display an image.

During the touch sensing period between the image display periods (e.g., a blank period between adjacent frames), a touch driving signal may be applied to the common electrode 151 (i.e., the touch electrode 151) through the touch line SL.

In addition, a sensing signal may be detected by the common electrode 151 and may be applied to the touch line SL, and in this case, the sensing signal is produced to contain information on a variation in electrostatic capacitance of each touch block TB caused by a touch event. The sensing signal may be used to determine whether there is a touch event provided from a user.

As described above, the common electrode 151 in the touch block TB may be used as not only an electrode for producing an electric field but also the touch electrode 151 for sensing a touch event, and thus, it may be possible to realize the liquid crystal panel 100 of the in-cell structure and to reduce a thickness of the liquid crystal panel 100.

In an embodiment, the opposite substrate OS facing the array substrate AS may be provided to have a size smaller than the array substrate AS. For example, the opposite substrate OS may be disposed to expose a portion of an edge region of the array substrate AS. In detail, the opposite substrate OS may not cover a lower edge region of the array substrate AS, in which a panel driving circuit 300 is disposed, and which is overlapped with the non-display region NA.

The panel driving circuit 300 may be fabricated in the form of, for example, an integrated circuit (IC) and then may be mounted on the non-display region NA of the array substrate AS in a chip-on-glass (COG) manner.

The panel driving circuit 300 may be configured to produce various driving signals, which are required to operate the liquid crystal panel 100, and to provide such driving signals to the liquid crystal panel 100. That is, the operations of the liquid crystal panel 100 may be controlled by the driving signals provided from the panel driving circuit 300.

For example, the panel driving circuit 300 may output a gate signal to a gate line and may output a data signal to a data line. Furthermore, the panel driving circuit 300 may output a common voltage or a touch driving signal to the touch line SL. The panel driving circuit 300 may receive a sensing signal, which is produced in the common electrode 151, through the touch line SL.

The panel driving circuit 300 may include a data driving circuit, a gate driving circuit, and a touch sensing circuit, which are configured to drive the data line, the gate line, and the touch line, respectively. In an embodiment, the data driving circuit, the gate driving circuit, and the touch sensing circuit may be provided as separate integrated circuits. In another embodiment, an integrated circuit, in which at least two of the circuits are integrated, may be used. In the present embodiment, a single integrated circuit, in which all of the data driving circuit, the gate driving circuit, and the touch sensing circuit are integrated, may be used as the panel driving circuit 300.

As another example, the panel driving circuit 300, which is provided in the form of an IC, may be mounted on a flexible circuit film and may be connected to the liquid crystal panel 100 through the flexible circuit film.

Hereinafter, a structure of an LCD device 10 according to the present embodiment will be described in more detail with reference to FIGS. 3 and 4.

Figure 3:
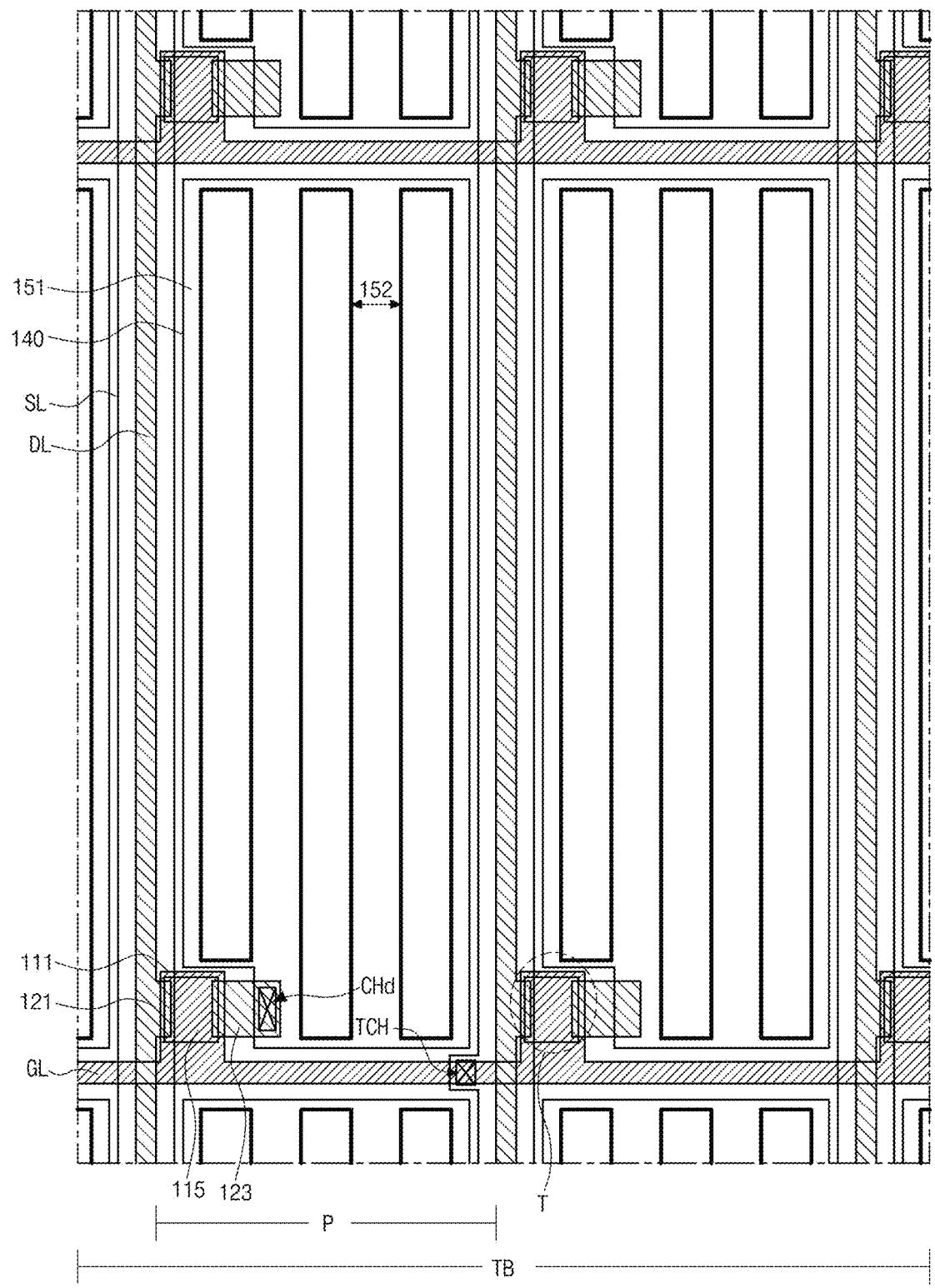
FIG. 3 is a plan view illustrating a portion of a touch block of an array substrate of an LCD device according to an embodiment of the present disclosure.

FIG. 3 is a plan view illustrating a portion of a touch block of an array substrate of an LCD device according to an embodiment of the present disclosure. FIG. 4 is a cross-sectional view illustrating a portion of a touch block of an LCD device according to an embodiment of the present disclosure.

Figure 4:
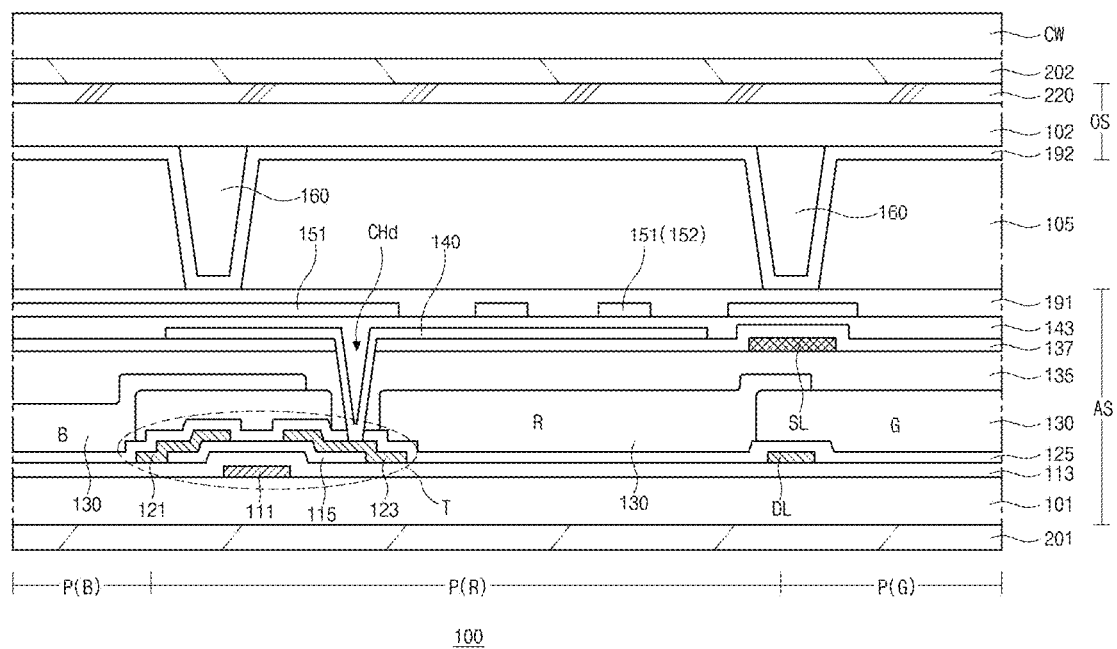
FIG. 4 is a cross-sectional view illustrating a portion of a touch block of an LCD device according to an embodiment of the present disclosure.

Referring to FIGS. 3 and 4, an LCD device 10 according to an embodiment of the present disclosure may include a liquid crystal panel 100, a first polarizing plate 201 attached to a bottom surface of the liquid crystal panel 100, a second polarizing plate 202 attached to a top surface of the liquid crystal panel 100, and a cover window CW attached to a top surface of the second polarizing plate 202. Here, the bottom and top surfaces of the liquid crystal panel 100 may be outer surfaces of the liquid crystal panel 100, which are opposite to each other and are respectively located adjacent to the back-light unit and the image display surface.

A thin film transistor T and the touch electrode 151, which is used as the common electrode, may be formed in the array substrate AS of the liquid crystal panel 100. In addition, a color filter pattern 130 may be formed in the array substrate AS.

A gate line GL may be formed on a top or inner surface of a first substrate 101 to extend in a first direction (e.g., the row direction). A gate electrode 111 may be formed and may be connected to the gate line GL. The gate line GL and the gate electrode 111 may be formed of the same metallic material, in the same process. The gate line GL and the gate electrode 111 may be formed to have a single- or multi-layered structure, which contains at least one of, for example, aluminum (Al), aluminum alloys (e.g., AlNd), copper (Cu), molybdenum (Mo), molybdenum alloys (e.g., MoTi), and chromium (Cr).

A gate insulating layer 113, which is an insulating layer, may be formed on the gate line GL and the gate electrode 111. The gate insulating layer 113 may be formed of or include at least one of inorganic insulating materials (e.g., silicon oxide and silicon nitride).

On the gate insulating layer 113, a semiconductor layer 115 may be formed corresponding to the gate electrode 111. The semiconductor layer 115 may be formed of or include at least one of, for example, amorphous silicon and oxide semiconductor materials.

A source electrode 121 and a drain electrode 123, which are spaced apart from each other, may be formed on the semiconductor layer 115. A data line DL may be formed on the gate insulating layer 113 to extend in a second direction (e.g., the column direction) crossing the first direction. The source electrode 121, the drain electrode 123, and the data line DL may be formed of the same metallic material, in the same process. The data line DL, the source electrode 121, and the drain electrode 123 may be formed to have a single- or multi-layered structure, which contains at least one of, for example, aluminum (Al), aluminum alloys (e.g., AlNd), copper (Cu), molybdenum (Mo), molybdenum alloys (e.g., MoTi), and chromium (Cr).

A plurality of pixel regions P may be defined in a matrix shape by the gate line GL and the data line DL crossing each other.

The gate electrode 111, the semiconductor layer 115, the source electrode 121, and the drain electrode 123 may constitute the thin film transistor T in each pixel region P.

In the present embodiment, a transistor of an inverted-staggered or a bottom-gate structure is illustrated as an example of the thin film transistor T. However, in an embodiment, a thin film transistor of a coplanar or top-gate structure may be provided as the thin film transistor T, and in this case, the semiconductor layer may be formed of or include at least one of polysilicon or oxide semiconductor materials.

A first protection layer 125, which is an insulating layer, may be formed on the entire region of the first substrate 101 to cover the thin film transistor T. The first protection layer 125 may be formed of or include at least one of inorganic or organic insulating materials. Here, the inorganic insulating material may include, for example, silicon oxide, silicon nitride, or the like, and the organic insulating material may include photo acryl, benzocyclobutene or the like.

On the first protection layer 125, the color filter pattern 130 may be formed corresponding to each pixel region P.

In the liquid crystal panel 100, the pixel regions P of red (R), green (G), and blue (B) colors may be alternately disposed in a specific direction (e.g., the row direction), as exemplarily shown in FIG. 4, and color filter patterns 130 of red (R), green (G), and blue (B) colors may be patterned and formed in the pixel regions P of red (R), green (G), and blue (B) colors to display their own colors.

In the present embodiment, the LCD device 10 has been described to have a color filter on thin film transistor (COT) structure, in which the color filter pattern 130 is formed on the thin film transistor T of the array substrate AS. As another example, the LCD device 10 may be configured to have a structure, in which the color filter pattern 130 is provided as a part of the opposite substrate OS.

A second protection layer 135, which is an insulating layer, may be formed on the entire region of the first substrate 101 to cover the color filter pattern 130. The second protection layer 135 may be formed of or include at least one of inorganic or organic insulating materials.

The touch line SL may be formed on the second protection layer 135. In the touch block TB, the touch line SL may be extended in an extension direction of the data line DL and may be overlapped with the data line DL. In the case where the touch line SL is disposed to overlap with the data line DL, which is one of non-display elements, it may be possible to maximally increasing a width of the touch line SL, without a reduction of an aperture ratio by the presence of the touch line SL, and thereby to allow the touch line SL to have a lowered resistance.

A third protection layer 137, which is an insulating layer, may be formed on the entire region of the first substrate 101 to cover the touch line SL. The third protection layer 137 may be formed of or include at least one of inorganic or organic insulating materials.

A pixel electrode 140 may be formed on the third protection layer 137 and in each pixel region P. Here, the pixel electrode 140 may be formed to have a substantially plate shape in each pixel region P. The pixel electrode 140 may be connected to the drain electrode 123 of the thin film transistor T in a corresponding one of the pixel regions P. For example, the pixel electrode 140 may be in contact with and connected to the drain electrode 123 through a drain contact hole CHd, which is formed to penetrate the first, second, and third protection layers 125, 135, and 137.

A fourth protection layer 143, which is an insulating layer, may be formed on the pixel electrode 140. The fourth protection layer 143 may be formed of or include at least one of inorganic or organic insulating materials.

The touch electrode 151 (i.e., the common electrode 151) may be formed on the fourth protection layer 143 and in each touch block TB. The common electrode 151, in conjunction with the pixel electrode 140, may produce a fringe field that is used to change an alignment direction of liquid crystal molecules.

To produce the fringe field, the common electrode 151 may include a plurality of bar-shaped electrode patterns 152, which face the pixel electrode 140 corresponding to each pixel region P, and an opening may be formed between the electrode patterns 152.

Regarding the disposition or arrangement structure of the common electrode 151 and the pixel electrode 140, in another embodiment, the common electrode 151 may be provided in a plate shape substantially in each touch block TB, whereas the pixel electrode 140, which is composed of a plurality of electrode patterns, may be provided on the common electrode 151 with an insulating layer interposed therebetween.

In other embodiment, each of the common and pixel electrodes 151 and 140 may be formed to have an electrode pattern, and they may be disposed on the same layer or may be disposed with an insulating layer interposed therebetween.

A first alignment layer 191 may be formed on the top surface of the array substrate AS to determine an initial alignment of liquid crystal molecules. In other words, the first alignment layer 191 may be formed on the common electrode 151. The first alignment layer 191 may be formed of or include, for example, polyimide.

In an embodiment, the first polarizing plate 201 may be attached to the bottom or outer surface of the array substrate AS. Here, the first polarizing plate 201 may be directly attached to the bottom surface of the first substrate 101 through an adhesive member.

For example, a typical polarizing plate may be used as the first polarizing plate 201, and in this case, the first polarizing plate 201 may include a polarizing layer and protection layers, which are provided on opposite surfaces (i.e., bottom and top surfaces) of the polarizing layer, but may not need an additional static electricity prevention layer having a static electricity prevention function. The first polarizing plate 201 may have a sheet resistance of about $10^{12}$ Ω/sq or higher, and in this case, the first polarizing plate 201 cannot be used as a static electricity prevention element, because the first polarizing plate 201 has substantially an insulating property.

The opposite substrate OS may be combined with the array substrate AS and may face the array substrate AS, with a liquid crystal layer 105 interposed therebetween. The opposite substrate OS may be disposed adjacent to the display surface of the liquid crystal panel 100, which is used to display an image, and to which a touch event is input.

The opposite substrate OS may include a column spacer 160, which is provided on a bottom or inner surface of a second substrate 102 and is used to maintain a cell gap or a thickness of the liquid crystal layer 105. The column spacer 160 may be disposed corresponding to non-display elements (e.g., the thin film transistor T, the data line DL, the gate line GL, and so forth) in the array substrate AS.

The column spacer 160 may be formed through a mask process and, for example, may be formed by performing several processes including deposition, exposure, developing, etching, and strip processes. A thermal treatment process may be performed on the column spacer 160 formed by the mask process.

The column spacer 160 may be formed to include a black pigment, and in this case, the column spacer 160 may have a light-blocking function preventing or suppressing leakage light from entering a neighboring pixel region, like a black matrix.

A second alignment layer 192 may be formed on the inner surface of the second substrate 102 provided with the column spacer 160. The second alignment layer 192 may be formed of or include, for example, polyimide.

The second alignment layer 192 may be formed through a process of coating an alignment material, and thereafter, a thermal treatment process may be performed. Similarly, the first alignment layer 191 may be formed through a coating process, and then a thermal treatment process may be performed.

A static electricity prevention layer 220 may be formed on a top or outer surface of the second substrate 102.

The static electricity prevention layer 220 may be used to discharge static electricity, which is produced in a fabrication process of the LCD device 10 (for example, including a test process), to the outside. Since the static electricity prevention layer 220 is placed adjacent to the display surface of the LCD device 10, it is necessary to configure the static electricity prevention layer 220 so as to suppress interference with an electrostatic capacitance between a user's finger and the touch electrode 151, which is produced when a touch event is input through the display surface of the LCD device 10.

To achieve the static electricity prevention without the interference with the touch-induced capacitance, the static electricity prevention layer 220 in the present embodiment may have a sheet resistance preferably ranging from about $10^{6.5}$ Ω/sq to about $10^9$ Ω/sq.

With regard to a proper range of the sheet resistance, if the sheet resistance is less than $10^{6.5}$ Ω/sq, the static electricity prevention layer 220 may act as a conductor causing interference with electrostatic capacitance by a touch event, and this may lead to a difficulty in recognizing the touch event. By contrast, if the sheet resistance is greater than $10^9$ Ω/sq, the static electricity prevention layer 220 may act as an insulator hindering static electricity from being exhausted to the outside, and thus, defects caused by the static electricity may occur.

Accordingly, the static electricity prevention layer 220 may be preferably configured to serve as a dielectric material preventing the interference issue with touch-induced capacitance when there is a touch event and to serve as a conductor preventing the static electricity issue when there is a static electricity issue. For example, the static electricity prevention layer 220 is configured to have sheet resistance of about $10^{6.5}$ Ω/sq to about $10^9$ Ω/sq.

In addition, preferably, the static electricity prevention layer 220 may have transmittance that is sufficiently high not to cause any substantial change in brightness of an image, because the static electricity prevention layer 220 in the present embodiment is placed adjacent to the display surface. For example, the static electricity prevention layer 220 is configured to have transmittance of about 97% or higher.

To allow the static electricity prevention layer 220, which is formed on the opposite substrate OS, to have the reliable sheet resistance and transmittance properties, the static electricity prevention layer 220 in the present embodiment may be preferably formed of a host material including at least one of $In_2O_3$ and $SnO_2$ and a dopant material including at least one of $SiO_2$, $ZrO_2$, $HfO_2$, $Nb_2O_5$, and $Ta_2O_5$.

The static electricity prevention layer 220 formed of the material may have a thickness of about 100 Å to about 300 Å.

In the static electricity prevention layer 220, a content of the dopant material may be in a range of about 9 wt % to 15 wt %, and a content of the host material, which is given by subtracting the content of the dopant material from the total content, may be in a range of about 85 wt % to 91 wt %.

In the case where one of $In_2O_3$ and $SnO_2$ is used as the host material, the content of the dopant material may be in a range of about 12 wt % to about 15 wt %, and the content of the host material may be in a range of about 85 wt % to about 88 wt %.

In the case where a mixture of $In_2O_3$ and $SnO_2$ is used as the host material, the content of the dopant material may be in a range of about 9 wt % to about 11 wt %, and the content of the host material may be in a range of about 89 wt % to about 91 wt %.

As described above, the content of the dopant material may vary depending on the composition of the host material, and consequently, the content of the host material may be changed.

Meanwhile, as the content of the dopant material increases, the sheet resistance of the static electricity prevention layer 220 increases. Even in such cases, by adjusting the content of the dopant material, the sheet resistance of the static electricity prevention layer 220 may be controlled to be within a range required for the LCD device 10.

Furthermore, by adjusting an oxygen partial pressure in a process chamber during a process of depositing the static electricity prevention layer 220 on the second substrate 102, the sheet resistance of the static electricity prevention layer 220 can be controlled to be within the range required for the LCD device 10, and this will be described in more detail below.

The second polarizing plate 202 may be attached to a top or outer surface of the opposite substrate OS provided with the static electricity prevention layer 220. Here, the second polarizing plate 202 may be directly attached to the top surface of the static electricity prevention layer 220 through an adhesive member.

For example, similar to the first polarizing plate 201, a typical polarizing plate may be used as the second polarizing plate 202, and in this case, the second polarizing plate 202 may include a polarizing layer and protection layers, which are provided on opposite surfaces (i.e., bottom and top surfaces) of the polarizing layer, but may not need an additional static electricity prevention layer having a static electricity prevention function. The second polarizing plate 202 may have a sheet resistance of about $10^{12}$ Ω/sq or higher, and in this case, the second polarizing plate 202 cannot be used as a static electricity prevention element, because the second polarizing plate 202 has substantially an insulating property.

The cover window CW may be attached to a top or outer surface of the second polarizing plate 202, which is provided on the top or display surface of the liquid crystal panel 100, to which the first and second polarizing plates 201 and 202 are attached. Here, the cover window CW may be directly attached to the top surface of the second polarizing plate 202 through an adhesive member.

As described above, in the touch LCD device 10 of the in-cell structure according to the present embodiment, the static electricity prevention layer 220, which is formed of a host material including at least one of $In_2O_3$ and $SnO_2$ and a dopant material including at least one of $SiO_2$, $ZrO_2$, $HfO_2$, $Nb_2O_5$, and $Ta_2O_5$, may be formed on the outer surface of the opposite substrate OS. In the case where the static electricity prevention layer 220 is formed of the materials, it may be possible to effectively secure a sheet resistance of about $10^{6.5}$ Ω/sq to about $10^9$ Ω/sq, which is advantageous to prevent the issues of static electricity and interference with touch-induced capacitance, and to effectively secure the transmittance of about 97% or higher, which is advantageous to maintain the image brightness to a desired level.

Thus, the opposite substrate OS can be disposed adjacent to the display surface or the top surface of the liquid crystal panel 100, and thus, the in-cell touch LCD device can be configured to have the non-inverted panel structure.

Thus, it may be possible to effectively overcome the technical problems, which occur in the conventional inverted panel structure. For example, it is unnecessary to form an additional inorganic insulating layer for reducing the recognition of reflection by the gate metal in the inverted panel structure. Furthermore, it is unnecessary to provide an expensive polarizing plate having a static electricity prevention function near the display surface, and a typical polarizing plate can be cost-effectively used in the inverted panel structure. In addition, an additional apparatus for inverting the panel is not required.

Furthermore, the static electricity prevention layer 220 may be formed using the existing sputtering system, which is used to form a transparent conductive layer on the outer surface of the opposite substrate, as it is, and thus, there is no additional cost to prepare a new system.

Thus, according to the present embodiment, it may be possible to improve productivity and to reduce fabrication cost.

Hereinafter, a method of fabricating a touch LCD device, which is of the in-cell structure and has the afore-described features, will be described in more detail with reference to FIGS. 5 to 7.

Figure 5:
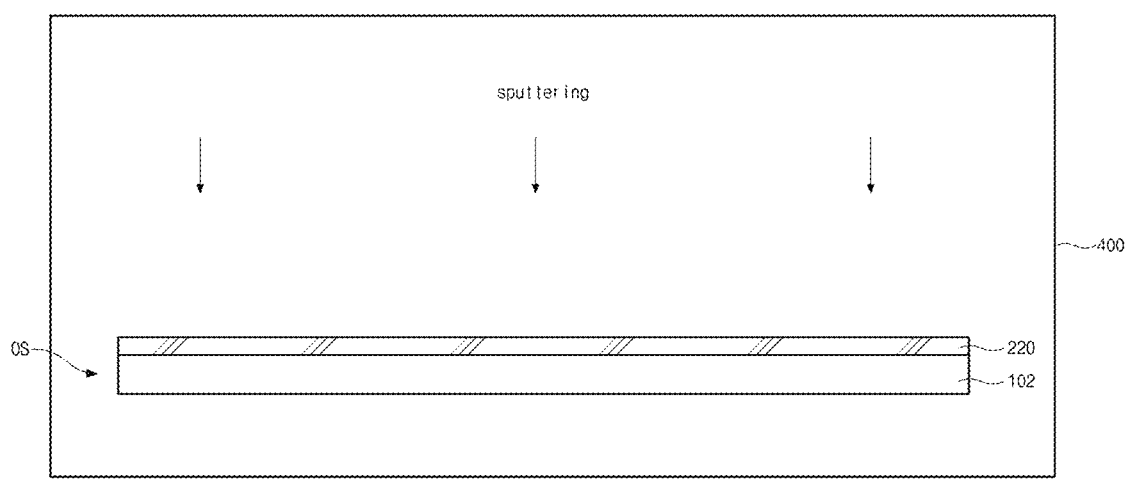
FIGS. 5 to 7 are cross-sectional views schematically illustrating a process of fabricating an opposite substrate of a touch LCD device according to an embodiment of the present disclosure.
Figure 6:
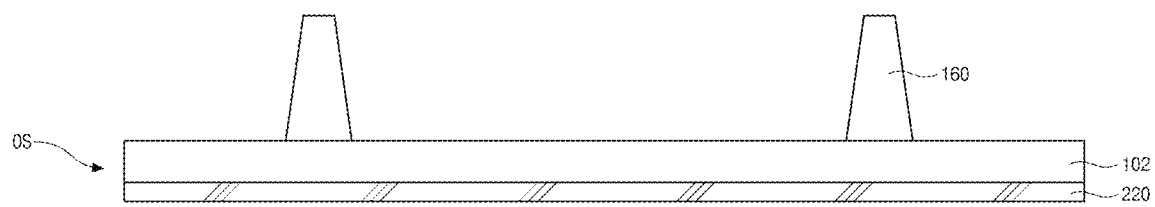
Figure 7:
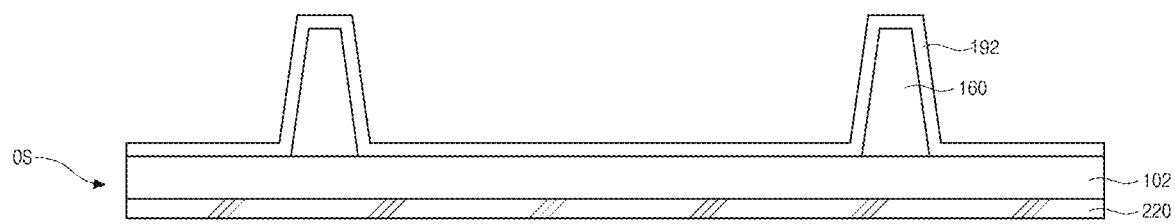

FIGS. 5 to 7 are cross-sectional views schematically illustrating a process of fabricating an opposite substrate of a touch LCD device according to an embodiment of the present disclosure.

Referring to FIG. 5, the second substrate 102 of the opposite substrate OS may be placed in a sputtering deposition chamber 400, and a sputtering process may be performed on an outer surface of the second substrate 102 to form the static electricity prevention layer 220 on at least a part or the entire outer surface of the second substrate 102.

In the sputtering process, a target, which is a deposition source, may be composed of a host material and a dopant material, which are exploited to form the static electricity prevention layer 220. In an embodiment, the host material may include at least one of $In_2O_3$ and $SnO_2$, and the dopant material may include at least one of $SiO_2$, $ZrO_2$, $HfO_2$, $Nb_2O_5$, and $Ta_2O_5$.

Since the target is used for the sputtering process, the host material and the dopant material may be deposited to form the static electricity prevention layer 220, and in an embodiment, the static electricity prevention layer 220 may be formed to have a thickness of for example, about 100 Å-300 Å.

The static electricity prevention layer 220 may stably maintain the sheet resistance range of about $10^{6.5}$ Ω/sq to about $10^9$ Ω/sq, which is required for the LCD device 10, even after a subsequent process on the opposite substrate OS. Accordingly, it may be possible to secure the static electricity prevent property and to prevent the interference with electrostatic capacitance caused by a touch event. Furthermore, for the static electricity prevention layer 220 having the afore-described features, it may be possible to stably maintain the transmittance to a value of about 97% or higher and thereby to secure a desired image brightness of the touch LCD device.

To stably secure the sheet resistance property in the static electricity prevention layer 220, a content of the dopant material may be in a range of about 9 wt % to about 15 wt %, and a content of the host material may be in a range of about 85 wt % to about 91 wt %.

In the case where one of $In_2O_3$ and $SnO_2$ is used as the host material, the content of the dopant material may be in a range of about 12 wt % to about 15 wt %, and the content of the host material may be in a range of about 85 wt % to about 88 wt %.

In the case where a mixture of $In_2O_3$ and $SnO_2$ is used as the host material, the content of the dopant material may be in a range of about 9 wt % to about 11 wt %, and the content of the host material may be in a range of about 89 wt % to about 91 wt %. In this case, the content of $SnO_2$ in the host material may be preferably higher than that of $In_2O_3$, and for example, the content of $SnO_2$ may be in a range of about 50 wt % to about 70 wt %, and $In_2O_3$ may have a remaining content.

Here, as the content of the dopant material increases, the sheet resistance also increases. By adjusting the content of the dopant material within the above range in consideration of this relation between the content and the sheet resistance, it may be possible to secure the sheet resistance advantageous for the LCD device 10.

Meanwhile, the static electricity prevention layer 220 may be a layer that is firstly deposited on the second substrate 102 and may be deposited at a room or high temperature.

In the case where a mixture of $In_2O_3$ and $SnO_2$ is used as the host material, a content ratio of $SnO_2$ may be higher in the high temperature deposition than in the room temperature deposition. In other words, the content ratio of $SnO_2$ in the high temperature deposition may be higher than the content ratio of $SnO_2$ in the room temperature deposition.

For example, when the deposition process is performed under a room temperature condition of about 15° C. to 100° C., the content of $SnO_2$ may be in a range of 50 wt % to 60 wt %. By contrast, when the deposition process is performed under a high temperature condition of about 100° C. to 300° C., the content of $SnO_2$ may be in a range of 60 wt % to 70 wt %.

Meanwhile, the sheet resistance may be changed depending on an amount of oxygen (or an oxygen partial pressure) supplied into the sputtering deposition chamber 400, and considering this, an oxygen amount may be adjusted in the sputtering process, which is performed on the static electricity prevention layer 220, so as to secure the sheet resistance range required for the LCD device 10.

In detail, as an oxygen amount in a deposition process increases, a sheet resistance of a deposition material decreases. That is, the sheet resistance may be in inverse proportion to the oxygen amount. By contrast, the sheet resistance may be in proportion to the content of the dopant material, as described above. Due to these relations, when the content of the dopant material is high, the required sheet resistance property can be achieved by increasing the oxygen amount, and when the content of the dopant material is low, the required sheet resistance property can be achieved by lowering the oxygen amount.

Here, the oxygen amount or the oxygen flow for securing the sheet resistance of the static electricity prevention layer 220 may be in a range of about 5 sccm to 20 sccm but is not limited to this range.

Next, referring to FIG. 6, the column spacer 160 may be formed on an inner surface of the second substrate 102, after the formation of the static electricity prevention layer 220. The column spacer 160 may be formed corresponding to non-display elements formed in the array substrate (e.g., see AS of FIG. 4), and the non-display elements may include the thin film transistor (e.g., T in FIG. 4), the data line (e.g., DL in FIG. 4), and the gate line (e.g., GL in FIG. 3).

The column spacer 160 may be formed by a mask process. For example, the formation of the column spacer 160 may include a process of depositing an organic material for the column spacer, a process of coating a photoresist layer, a process of exposing the photoresist layer using a photomask, a process of developing the exposed photoresist layer, an etching process of patterning the deposited organic material, and a process of stripping the photoresist layer. A thermal treatment process or a first thermal treatment process may be performed after the mask process.

Here, the thermal treatment process on the column spacer 160 may be a process of curing the organic material and may be performed at a high temperature for a specific time (e.g., at about 230° C. for about 20 minutes).

In an embodiment, the column spacer 160 may be formed to include a black pigment (e.g., carbon), and in this case, the column spacer 160 may have a light-blocking function preventing or suppressing leakage light from entering a neighboring pixel region, like the black matrix.

Next, referring to FIG. 7, the second alignment layer 192 may be formed by coating an alignment material on the inner surface of the second substrate 102 provided with the column spacer 160, and then, a thermal treatment process or a second thermal treatment process may be performed on the alignment material. For example, polyimide may be used as the material of the second alignment layer 192.

In an embodiment, a cleaning process may be performed on the second substrate 102, before the coating of the alignment material.

Here, the thermal treatment process on the second alignment layer 192 may be a process of curing the alignment material and may be performed at a high temperature for a specific time (e.g., at about 230° C. for about 15 minutes).

As a result of the afore-described processes, the opposite substrate OS with the static electricity prevention layer 220 may be fabricated.

In the afore-described process of fabricating the opposite substrate OS, the static electricity prevention layer 220 may be formed in advance of the processes of forming the column spacer 160 and the second alignment layer 192, and thus, the static electricity prevention layer 220 may be exposed to the subsequent processes. That is, the characteristics of the static electricity prevention layer 220 may be affected by the subsequent processes.

For this reason, considering that the static electricity prevention layer 220 is exposed to the subsequent process, the static electricity prevention layer 220 may be formed of the host and dopant materials whose content ratios are in the afore-described proper ranges before the processes of forming the column spacer 160 and the second alignment layer 192. Accordingly, it may be possible to stably secure the proper sheet resistance range of $10^{6.5}$ Ω/sq to $10^9$ Ω/sq and the proper transmittance of about 97% or higher, even when the static electricity prevention layer 220 is exposed to a process environment for subsequent processes (e.g., a developing solution (e.g., KOH) for forming the column spacer 160, a thermal treatment process thereon, and a cleaning solution (e.g., LGD-900) before the formation of the second alignment layer 192, and the thermal treatment process on the second alignment layer 192).

The liquid crystal panel (e.g., 100 in FIG. 4) may be fabricated by bonding the opposite substrate OS, which is fabricated by the above process, to the separately-fabricated array substrate (e.g., AS in FIG. 4) with a liquid crystal layer (e.g., 105 in FIG. 4) interposed therebetween.

The first and second polarizing plates (e.g., 201 and 202 in FIG. 4) may be attached to the bottom and top surfaces of the liquid crystal panel fabricated by the above process, and then, the cover window (e.g., CW in FIG. 4) may be attached to a top surface of the second polarizing plate. Accordingly, the LCD device (e.g., 10 in FIG. 4) may be fabricated.

According to experiments to evaluate chemical resistance and reliability characteristics, for the LCD device according to the present embodiment, the static electricity prevention layer 220 had the sheet resistance and transmittance characteristics that were maintained to the proper levels. These experiments will be described in more detail below. The following tables comprise values of a sheet resistance of a plurality of samples. In the tables, the values of the sheet resistance are expressed as the logarithm of the sheet resistance to base 10).

1. Comparative Experiment (Static Electricity Prevention Layer of GZTO)

In the comparative experiment, an in-cell touch LCD device had a non-inverted panel structure and included an opposite substrate, in which a static electricity prevention layer was made of GZTO, unlike the present disclosure. A substrate with the static electricity prevention layer of GZTO was prepared as an experiment sample for the comparative experiment.

The results of the comparative experiment 1 were summarized in the following Table 1 and FIG. 8.

TABLE 1

| | GZTO (O2 1.1%) | | | GZTO (O2 4%) | | |
|---|---|---|---|---|---|---|
| samples | 1-1 | 1-2 | 1-3 | 2-1 | 2-2 | 2-3 |
| As deposited (after deposition) | 5.8 | 6 | 5.9 | 11.8 | 11.8 | 11.8 |
| 230° C., 20 min | 8.1 | 7.9 | 7.8 | 7.4 | 8.5 | 8.4 |
| 230° C., 15 min | 8.2 | 8 | 7.7 | 7.3 | 8.4 | 7.8 |
| 24 hr | 6.1 | 6.2 | 6.1 | 5.9 | 6.3 | 6.1 |
| 48 hr | 6 | 5.1 | 6.1 | 6 | 6.3 | 6.2 |
| 120 hr | 6.3 | 6.4 | 6.3 | 6.2 | 6.5 | 6.4 |
| 144 hr | 6.2 | 6.4 | 6.3 | 6.4 | 6.9 | 6.5 |
| 168 hr | 5.8 | 5.9 | 5.9 | 5.6 | 5.9 | 5.8 |
| 288 hr | 5.6 | 5.9 | 5.5 | 5.2 | 5.4 | 5.4 |
| 336 hr | 5.6 | 5.8 | 5.6 | 5.6 | 5.6 | 5.5 |
| 360 hr | 5.5 | 5.7 | 5.6 | 5.6 | 5.7 | 5.6 |
| 384 hr | 5.5 | 5.7 | 5.6 | 5.6 | 5.7 | 5.6 |
| 456 hr | 5.5 | 5.6 | 5.6 | 5.5 | 5.7 | 5.6 |
| 480 hr | 5.3 | 5.7 | 5.5 | 5.5 | 5.7 | 5.6 |
| 504 hr | 5.3 | 5.6 | 5.5 | 5.5 | 5.7 | 5.7 |
| 528 hr | 5.3 | 5.6 | 5.6 | 5.5 | 5.6 | 5.5 |
| 552 hr | 5.3 | 5.6 | 5.5 | 5.5 | 5.6 | 5.5 |
| 624 hr | 5.5 | 5.6 | 5.5 | 5.6 | 5.6 | 5.5 |
| 648 hr | 5.5 | 5.6 | 5.5 | 5.6 | 5.6 | 5.5 |
| 672 hr | 5.3 | 5.7 | 5.5 | 5.6 | 5.9 | 5.6 |
| 696 hr | 5.3 | 5.7 | 5.6 | 5.7 | 5.8 | 5.5 |
| 720 hr | 5.6 | 5.8 | 5.6 | 5.8 | 5.8 | 5.7 |
| 792 hr | 5.5 | 5.7 | 5.6 | 5.7 | 5.8 | 5.6 |
| 816 hr | 5.5 | 5.8 | 5.6 | 5.6 | 5.8 | 5.6 |
| 840 hr | 5.5 | 5.8 | 5.7 | 5.7 | 5.8 | 5.6 |
| 864 hr | 5.8 | 6.0 | 5.8 | 6.3 | 6.5 | 6.0 |
| 888 hr | 5.0 | 6.5 | 5.3 | 6.5 | 6.8 | 6.3 |
| 960 hr | 6.3 | 6.5 | 6.5 | 7.3 | 7.5 | 7.0 |
| 984 hr | 6.3 | 6.5 | 6.5 | 7.0 | 7.3 | 7.0 |
| 1008 hr | 6.3 | 6.5 | 6.5 | 7.0 | 7.0 | 6.9 |

In the comparative experiment, a 6090 reliability test (temperature of 60° C. and humidity of 90%) was performed on three samples 1-1, 1-2, and 1-3 (for an oxygen partial pressure of 1.1% in a test sputtering deposition chamber) and on three samples 2-1, 2-2, and 2-3 (for an oxygen partial pressure of 4%). The sheet resistance characteristics of the samples were respectively measured after the sputtering deposition process, after two thermal treatment processes, and when elapsed time under condition for the 6090 reliability test reached some preset times.

In Table 1, the expression "230° C., 20 min" represents a process condition of a thermal treatment process performed on the column spacer, and the expression "230° C., 15 min" represents a process condition of a thermal treatment process performed on the second alignment layer.

Figure 8:
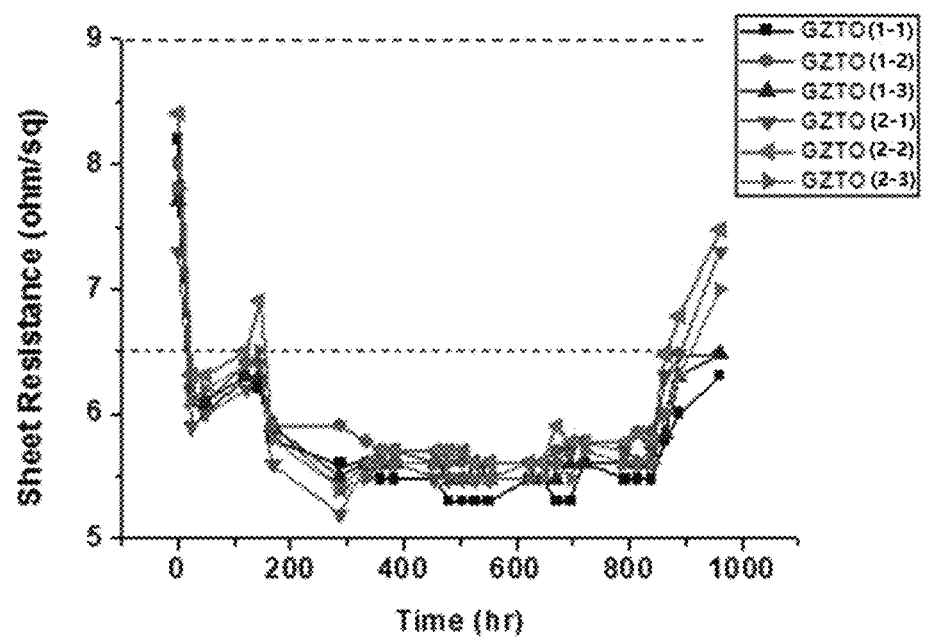
FIG. 8 is a graph showing a variation of sheet resistance over time in a comparative experiment.

In FIG. 8, the y-axis represents an exponent of a sheet resistance written with a base of 10 (i.e., logarithm of sheet resistance to base 10).

Referring to Table 1 and FIG. 8, the sheet resistance in the comparative experiment decreased by about $10^{1.5}$-$10^2$ Ω/sq, after 24 hr from the finish time of the two thermal treatment processes, decreased by about $10^{1.8}$-$10^{2.8}$ Ω/sq after 300 hr to show a saturated behavior, but reversely increased after 800 hr.

This result shows that the static electricity prevention layer of GTZO in the comparative experiment does not have good film quality, has an unstable sheet resistance characteristic, and could not secure the proper sheet resistance of $10^{6.5}$ to $10^9$ Ω/sq.

This means that the static electricity prevention layer made of GTZO could not be applied to a touch LCD device.

2. The Experiment 1 of the Present Disclosure (Static Electricity Prevention Layer, in which $Nb_2O_5$, and $SnO_2$ were Respectively Used as Dopant and Host)

In the experiment 1 of the present disclosure, an in-cell touch LCD device had a non-inverted panel structure and included an opposite substrate and a static electricity prevention layer on an outer surface of the opposite substrate, where the static electricity prevention layer was formed using $Nb_2O_5$ and $SnO_2$ as dopant and host materials, respectively. A substrate with the static electricity prevention layer of $Nb_2O_5$ and $SnO_2$ was prepared as an experiment sample for the experiment 1 of the present disclosure.

The results of the experiment 1 were summarized in the following Table 2 and FIGS. 9 and 10 visually illustrating the data of Table 2.

TABLE 2

|  | 10TNO | | | 11TNO | | | 12.5TNO | | |
| --- | --- | --- | --- | --- | --- | --- | --- | --- | --- |
| O2 pressure | 5% | 6% | 7% | 5% | 5% | 7% | 5% | 6% | 7% |
| after thermal treatment | 6.00 | 5.60 | 5.48 | 6.30 | 5.85 | 5.60 | 7.00 | 6.48 | 6.60 |
| 24 h | 5.70 | 5.30 | 5.30 | 6.00 | 5.60 | 5.48 | 6.70 | 6.30 | 6.30 |
| 48 h | 5.70 | 5.30 | 5.30 | 6.00 | 5.70 | 5.48 | 6.70 | 6.30 | 6.30 |
| 120 h | 5.70 | 5.48 | 5.48 | 6.00 | 5.70 | 5.48 | 6.78 | 6.30 | 6.30 |
| 144 h | 5.78 | 5.30 | 5.30 | 6.00 | 5.60 | 5.48 | 6.60 | 6.00 | 6.30 |
| 168 h | 5.85 | 5.30 | 5.48 | 6.00 | 5.70 | 5.60 | 6.70 | 6.30 | 6.30 |
| 192 h | 5.85 | 5.30 | 5.30 | 6.00 | 5.60 | 5.48 | 6.60 | 6.00 | 6.00 |
| 216 h | 5.78 | 5.30 | 5.00 | 5.85 | 5.60 | 5.48 | 6.60 | 6.00 | 6.00 |
| 288 h | 6.00 | 5.30 | 5.30 | 6.00 | 5.78 | 5.48 | 6.78 | 6.30 | 6.30 |
| 312 h | 5.78 | 5.30 | 5.30 | 6.00 | 5.70 | 5.48 | 6.78 | 6.30 | 6.30 |
| 336 h | 5.78 | 5.30 | 5.30 | 5.95 | 5.60 | 5.30 | 6.70 | 6.00 | 6.30 |
| 360 h | 5.78 | 5.30 | 5.30 | 5.95 | 5.60 | 5.48 | 6.78 | 6.30 | 6.30 |
| 384 h | 5.78 | 5.30 | 5.30 | 6.00 | 5.70 | 5.48 | 6.70 | 6.30 | 6.30 |
| 456 h | 5.90 | 5.30 | 5.30 | 6.00 | 5.78 | 5.60 | 6.78 | 6.30 | 6.48 |
| 480 h | 5.78 | 5.30 | 5.30 | 6.00 | 5.70 | 5.48 | 6.85 | 6.48 | 6.48 |
| 504 hr | 5.90 | 5.30 | 5.30 | 6.00 | 5.70 | 5.48 | 6.95 | 6.48 | 6.60 |
| 528 hr | 5.90 | 5.30 | 5.48 | 6.30 | 5.85 | 5.60 | 6.85 | 6.48 | 6.48 |
| 552 hr | 5.90 | 5.30 | 5.48 | 6.30 | 5.78 | 5.60 | 6.85 | 6.48 | 6.48 |
| 624 hr | 6.00 | 5.30 | 5.60 | 6.30 | 5.85 | 5.70 | 7.00 | 6.60 | 6.70 |
| 648 hr | 5.95 | 5.30 | 5.48 | 6.30 | 5.78 | 5.70 | 6.85 | 6.48 | 6.60 |
| 672 hr | 6.00 | 5.48 | 5.60 | 6.30 | 5.90 | 5.78 | 6.85 | 6.60 | 6.70 |
| 696 hr | 6.00 | 5.60 | 5.60 | 6.48 | 6.00 | 5.90 | 6.90 | 6.70 | 6.78 |
| 720 hr | 6.00 | 5.48 | 5.48 | 6.30 | 6.00 | 5.78 | 6.85 | 6.60 | 6.60 |
| 792 hr | 6.00 | 5.30 | 5.30 | 6.00 | 6.00 | 5.60 | 6.78 | 6.30 | 6.30 |
| 840 hr | 6.00 | 5.48 | 5.60 | 6.30 | 6.00 | 5.85 | 6.95 | 6.60 | 6.60 |
| 864 hr | 5.95 | 5.30 | 5.30 | 6.00 | 5.78 | 5.60 | 6.70 | 6.30 | 6.30 |
| 888 hr | 6.00 | 5.48 | 5.48 | 6.30 | 6.00 | 5.85 | 6.85 | 6.60 | 6.60 |
| 1008 hr | 6.00 | 5.60 | 5.48 | 6.30 | 6.00 | 5.85 | 6.85 | 6.60 | 6.48 |
| 1032 hr | 6.00 | 5.48 | 5.48 | 6.30 | 6.00 | 5.85 | 6.85 | 6.60 | 6.60 |

In the experiment 1, the 6090 reliability test was performed on samples having dopant content ratios of 10 wt %, 11 wt %, and 12.5 wt %, and the test for each sample was performed under oxygen partial pressure conditions of 5%, 6%, and 7% in a test sputtering deposition chamber. The sheet resistances of the samples were measured when the sputtering deposition process was finished, when two thermal treatment processes were finished, and when elapsed time under condition for the 6090 reliability test reached some preset times.

Meanwhile, in the experiment 1, the static electricity prevention layer was formed by a deposition process at a room temperature (50° C.).

Figure 9:
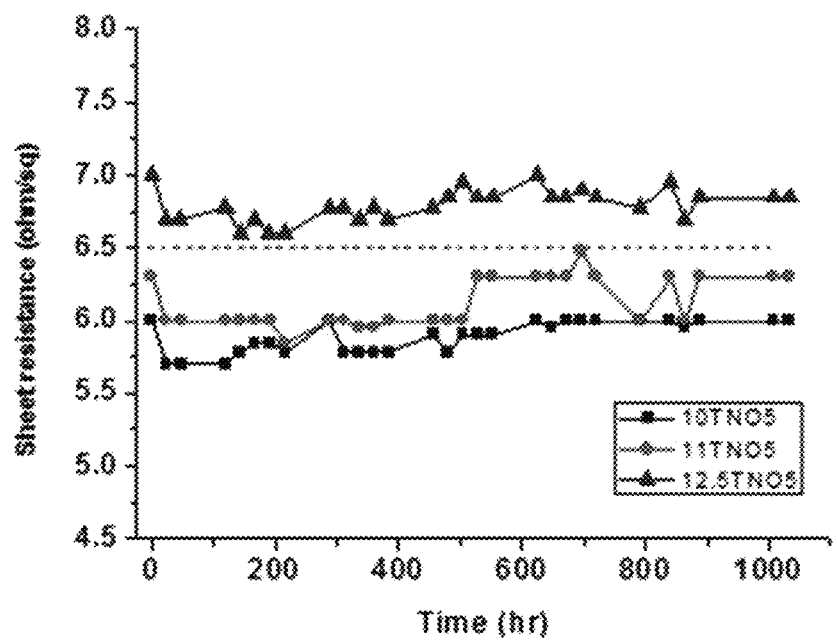
FIGS. 9 and 10 are graphs showing variations of sheet resistance over time in an experiment 1 of the present disclosure.
Figure 10:
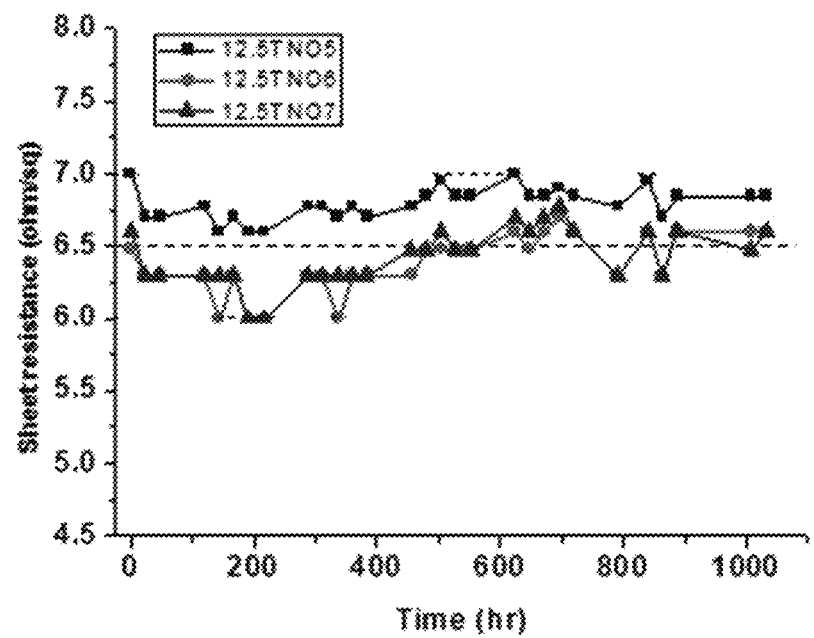

FIG. 9 shows sheet resistances of the samples (for the oxygen partial pressure of 5% and the dopant content ratios of 10 wt %, 11 wt %, and 12.5 wt %), and FIG. 10 shows sheet resistances of the samples (for the dopant content ratio of 12.5 wt % and the oxygen partial pressures of 5%, 6%, and 7%).

Referring to Table 2 and FIGS. 9 and 10, in the experiment 1, when the sample had the dopant content ratio of 12.5 wt %, the sheet resistance was in the proper range of $10^{6.5}$-$10^9$ $\Omega$/sq, whereas when the sample had the dopant content ratios of 10 wt % and 11 wt %, the sheet resistance was not in the proper range.

The transmittances measured in the present experiment 1 and the sheet resistances measured in the chemical resistance evaluation are respectively summarized in the following Tables 3 and 4 and FIGS. 11 and 12 visually illustrating the data of Tables 3 and 4.

TABLE 3

| | 10TNO ($Nb_2O_5$ 10%) | | | 11TNO ($Nb_2O_5$ 11%) | | | 12.5TNO ($Nb_2O_5$ 12.5%) | | |
|---|---|---|---|---|---|---|---|---|---|
| $O_2$ pressure | 5% | 6% | 7% | 5% | 6% | 7% | 5% | 6% | 7% |
| Avg (380 nm~760 nm) | 97.94 | 98.09 | 98.47 | 98.03 | 98.37 | 98.30 | 98.07 | 98.29 | 97.59 |
| at 550 nm | 97.92 | 98.16 | 98.57 | 98.26 | 98.53 | 98.55 | 98.41 | 98.42 | 97.80 |

TABLE 4

| | 12.5TNO_5% | 12.5TNO_6% | 12.5TNO_7% |
|---|---|---|---|
| As deposited (after deposition) | 7.60 | 7.30 | 7.00 |
| 230° C., 20 min | 7.60 | 7.30 | 7.00 |
| KOH 6 min | 7.85 | — | 7.48 |
| LGD-900 6 min | 7.48 | 7.00 | — |

Figure 11:
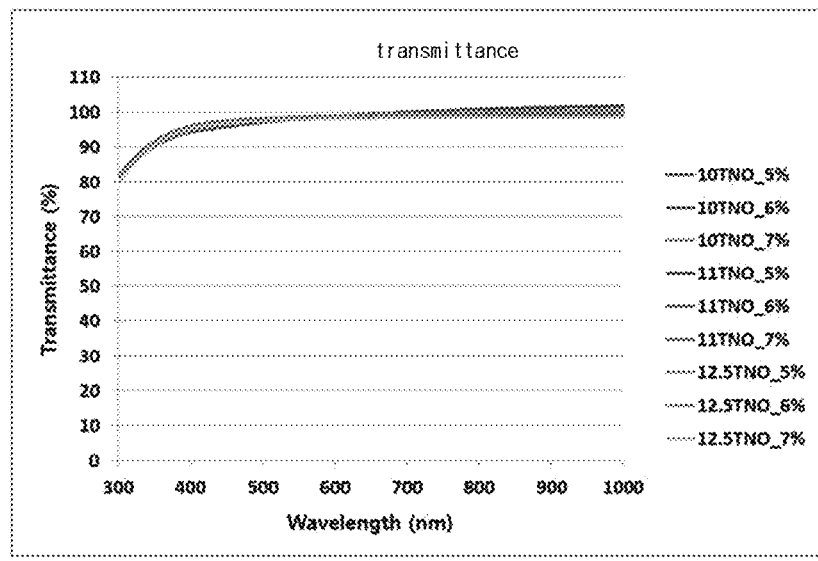
FIG. 11 is a graph showing results of transmittance versus wavelength, obtained in the experiment 1 of the present disclosure.

Table 3 and FIG. 11 show results of transmittance versus wavelength, obtained from the samples whose dopant content ratios were 10 wt %, 11 wt %, and 12.5 wt % when the oxygen partial pressures were 5%, 6%, and 7%.

Figure 12:
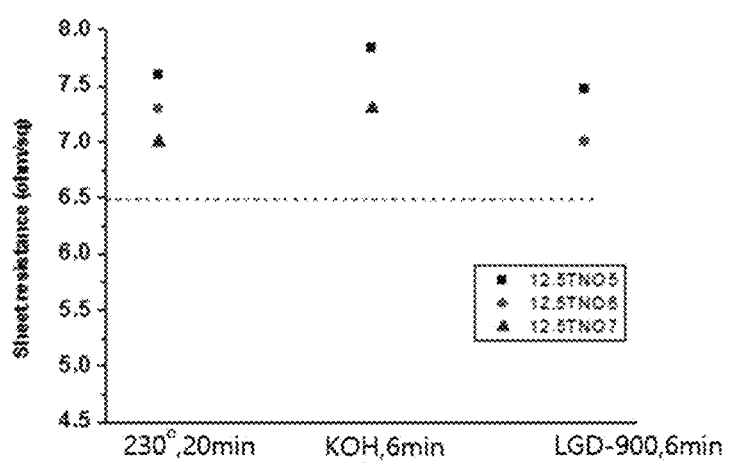
FIG. 12 is a graph showing results of sheet resistance obtained from a chemical resistance test, in the experiment 1 of the present disclosure.

Table 4 and FIG. 12 show sheet resistances measured from the chemical resistance test on the samples whose dopant content ratio was 12.5 wt % when the oxygen partial pressures were 5%, 6%, and 7%. In Table 4 and FIG. 12, the sheet resistances of the static electricity prevention layer were measured after the deposition process, after a thermal treatment process under a thermal treatment condition ("230° C., 20 min") for the column spacer, after a developing solution treatment process under a developing solution treatment condition ("KOH (0.04%), 6 min") for the column spacer, and after a cleaning solution treatment process under a cleaning solution treatment condition ("LGD-900, 6 min") before coating an alignment layer. The developing and cleaning solution treatment processes correspond to the chemical resistance test, and the conditions for the developing and cleaning solution treatment processes were set to be harsher than the real conditions for relevant processes.

Table 3 and FIG. 11 show that, for the samples, it is possible to secure the proper transmittance of 97% or higher within a visible wavelength range (e.g., from 380 to 760 nm).

Table 4 and FIG. 12 show that the sheet resistances measured in the chemical resistance test were within the proper sheet resistance range. This means that the samples could have the desired chemical resistant property.

3. The Experiment 2 of the Present Disclosure (Static Electricity Prevention Layer, in which $SiO_2$ and $In_2O_3$+$SnO_2$ were Used as Dopant and Host, and which was Deposited at Room Temperature)

In the experiment 2 of the present disclosure, an in-cell touch LCD device had a non-inverted panel structure and included an opposite substrate and a static electricity prevention layer on an outer surface of the opposite substrate, where the static electricity prevention layer was formed by a deposition process, in which $SiO_2$ and $In_2O_3$+$SnO_2$ were respectively used as the dopant and host materials, and which was performed at a room temperature (50° C.). A substrate with the static electricity prevention layer of $SiO_2$ and $In_2O_3$+$SnO_2$ was prepared as an experiment sample for the experiment 2 of the present disclosure.

The results of the experiment 2 were summarized in the following Table 5 and FIGS. 13 to 15 visually illustrating the data of Table 5.

TABLE 5

|  | 40SITO | | | 50SITO | | | 60SITO | | |
|---|---|---|---|---|---|---|---|---|---|
| O2 pressure | 5% | 6% | 7% | 5% | 6% | 7% | 5% | 6% | 7% |
| As deposited (after deposition) | 8.00 | 8.48 | 10.00 | 7.70 | 7.78 | 8.30 | 8.00 | 8.48 | 9.30 |
| KOH (25° C., 210 sec) | 8.78 | 9.78 | 10.70 | 8.00 | 8.30 | 9.30 | 8.48 | 8.85 | 9.85 |
| 230° C. 20 min | 9.00 | 9.48 | 9.95 | 7.90 | 7.60 | 7.30 | 8.48 | 7.70 | 7.60 |
| 230° C. 15 min | 9.30 | 9.00 | 9.48 | 8.30 | 7.48 | 7.48 | 8.85 | 8.48 | 8.00 |
| 0 | 9.30 | 9.00 | 9.48 | 8.30 | 7.48 | 7.48 | 8.85 | 8.48 | 8.00 |
| 24 | 8.30 | 8.60 | 8.95 | 7.30 | 6.90 | 6.70 | 7.60 | 7.78 | 7.30 |
| 48 | 8.90 | 9.48 | 10.00 | 7.48 | 6.95 | 7.48 | 8.00 | 8.30 | 8.00 |
| 216 | 8.78 | 8.70 | 9.00 | 7.00 | 7.00 | 7.30 | 7.60 | 7.70 | 7.48 |
| 288 | 8.85 | 7.78 | 9.30 | 7.30 | 7.30 | 7.30 | 7.78 | 7.85 | 7.78 |
| 312 | 8.70 | 8.90 | 9.30 | 7.30 | 7.48 | 7.48 | 7.78 | 7.85 | 7.85 |
| 336 | 8.78 | 8.95 | 9.30 | 7.30 | 7.30 | 7.60 | 7.78 | 7.35 | 7.78 |
| 360 | 8.85 | 9.00 | 9.30 | 7.30 | 7.48 | 7.60 | 7.85 | 8.00 | 8.00 |
| 384 | 8.30 | 8.95 | 9.30 | 7.00 | 7.30 | 7.30 | 7.70 | 7.70 | 7.70 |
| 456 | 8.78 | 9.00 | 9.30 | 7.30 | 7.48 | 7.60 | 7.85 | 7.90 | 7.85 |
| 504 | 8.95 | 9.30 | 9.48 | 7.30 | 7.60 | 7.70 | 7.90 | 8.00 | 7.95 |
| 528 | 8.60 | 8.90 | 9.00 | 7.00 | 7.48 | 7.30 | 7.70 | 7.60 | 7.70 |
| 552 | 9.30 | 9.48 | 9.70 | 7.48 | 7.85 | 7.95 | 8.30 | 8.30 | 8.48 |
| 624 | 8.48 | 9.30 | 9.00 | 7.00 | 7.00 | 7.30 | 7.48 | 7.60 | 7.60 |
| 648 | 8.78 | 8.90 | 9.00 | 7.30 | 7.48 | 7.60 | 7.90 | 7.90 | 7.85 |
| 696 | 8.30 | 8.48 | 8.85 | 6.90 | 7.00 | 7.30 | 7.48 | 7.48 | 7.60 |
| 792 | 8.70 | 9.00 | 9.00 | 7.30 | 7.30 | 7.70 | 7.95 | 7.90 | 7.90 |
| 840 | 8.48 | 8.70 | 8.85 | 7.00 | 7.30 | 7.30 | 7.60 | 7.60 | 7.60 |
| 888 | 8.60 | 8.90 | 9.00 | 7.30 | 7.48 | 7.48 | 7.78 | 7.85 | 7.78 |
| 960 | 9.00 | 9.30 | 9.60 | 7.00 | 7.48 | 7.48 | 8.00 | 8.30 | 8.00 |
| 1008 | 8.60 | 8.78 | 9.00 | 7.00 | 7.48 | 7.70 | 7.70 | 7.78 | 7.78 |
| 1056 | 8.70 | 8.95 | 9.30 | 7.30 | 7.00 | 7.70 | 7.78 | 7.95 | 7.85 |

In the experiment 2, the 6090 reliability test was performed on samples, in which dopant content ratios were 9 wt % and $SnO_2$ content ratios in the host were 40 wt %, 50 wt %, and 60 wt %, and the test for each sample was performed under oxygen partial pressure conditions of 5%, 6%, and 7% in a test sputtering deposition chamber. The sheet resistances of the samples were measured after the sputtering deposition process, after the developing solution treatment process, after two thermal treatment processes, and when elapsed time under condition for the 6090 reliability test reached some preset times.

Figure 13:
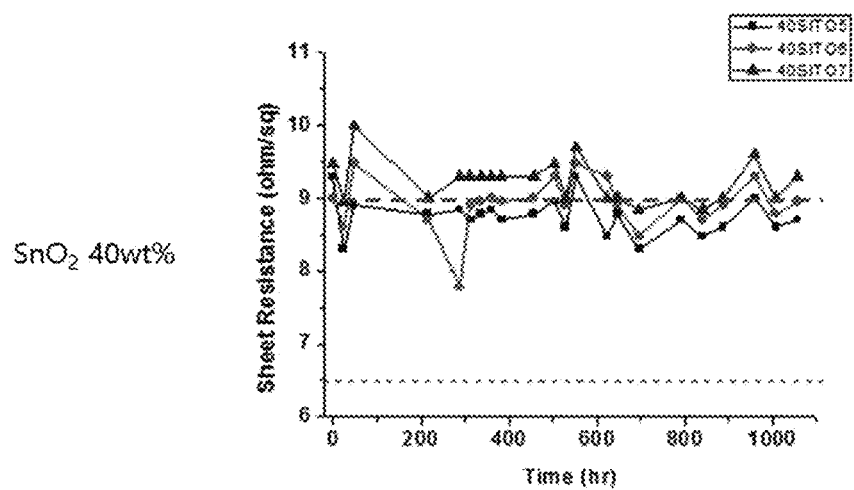
FIGS. 13 to 15 are graphs showing variations of sheet resistance over time in an experiment 2 of the present disclosure.
Figure 14:
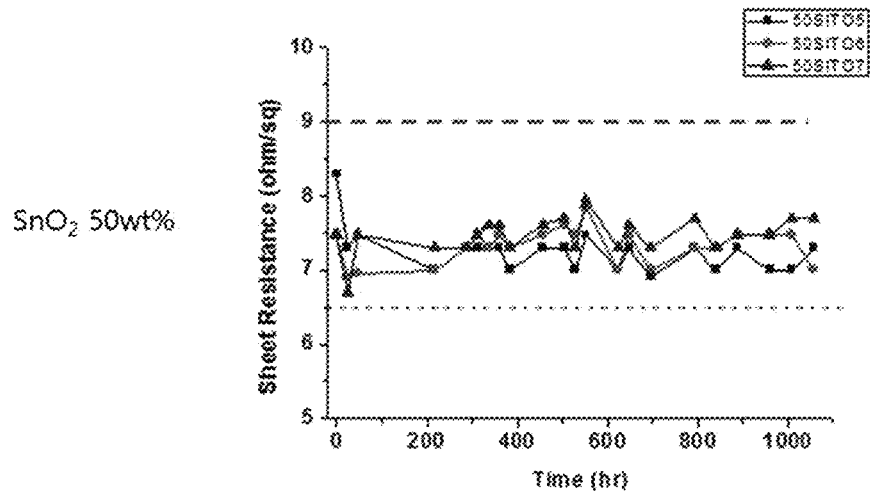
Figure 15:
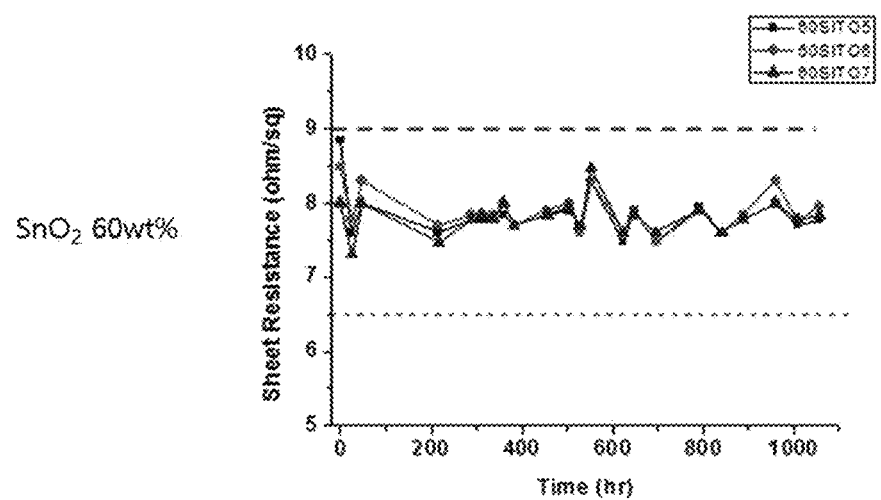

Each of FIGS. 13, 14, and 15 shows sheet resistances of the samples, whose $SnO_2$ content ratios in the host were 40 wt %, 50 wt %, and 60 wt %.

Referring to Table 5 and FIGS. 13 to 15, in the experiment 2, when the sample had the $SnO_2$ content ratios of 50 wt % and 60 wt %, the sheet resistances were within the proper sheet resistance range of $10^{6.5}$ to $10^9$ Ω/sq, whereas when the sample had the content ratio of 40 wt %, the sheet resistance was not in the proper sheet resistance range.

The following Table 6 shows transmittances of the samples in the present experiment 2, measured from the chemical resistance test and the reliability test.

TABLE 6

|  | 40SITO (SnO2 40%) | | | 50SITO (SnO2 50%) | | | 60SITO (SnO2 60%) | | |
|---|---|---|---|---|---|---|---|---|---|
| $O_2$ pressure | 5% | 6% | 7% | 5% | 6% | 7% | 5% | 6% | 7% |
| As deposited (after deposition) | 97.88 | 98.19 | 98.26 | 96.96 | 97.55 | 97.77 | 96.79 | 97.48 | 97.41 |
| chemical resistance test | 97.76 | 98.02 | 98.14 | 97.22 | 97.06 | 97.57 | 97.22 | 97.06 | 97.57 |
| reliability test | 97.92 | 98.37 | 98.40 | 97.34 | 97.20 | 97.84 | 97.50 | 97.07 | 97.87 |

Table 6 shows transmittances of samples having $SnO_2$ content ratios of 40 wt %, 50 wt %, and 60 wt %, respectively, measured in the chemical resistance test and the reliability test.

Referring to Table 6, in the chemical resistance test and the reliability test, the samples had transmittances of 97% or higher, which were in the proper transmittance range. This means that the samples in the present experiment 2 could have sufficient chemical resistance and reliability.

4. The Experiment 3 of the Present Disclosure (Static Electricity Prevention Layer, in Which $SiO_2$ and $In_2O_3$+$SnO_2$ Were Used as Dopant and Host, Which was Deposited at High Temperature)

In the experiment 3 of the present disclosure, an in-cell touch LCD device had a non-inverted panel structure and included an opposite substrate and a static electricity prevention layer on an outer surface of the opposite substrate, where the static electricity prevention layer was formed by a deposition process, in which $SiO_2$ and $In_2O_3$+$SnO_2$ were respectively used as the dopant and host materials, and which was performed at a high temperature (200° C.). A substrate with the static electricity prevention layer of $SiO_2$ and $In_2O_3$+$SnO_2$ was prepared as an experiment sample for the experiment 3 of the present disclosure.

The results of the experiment 3 are summarized in FIGS. 16A-16F and FIGS. 17A-17F.

In the experiment 3, the thermal treatment stability test, the chemical resistance test, and the 6090 reliability test were performed on samples, in which dopant content ratios were 9 wt %, 10 wt %, and 11 wt % and $SnO_2$ content ratios in the host were 60 wt %, when the oxygen partial pressures in a test sputtering deposition chamber were 3%, 4%, 5%, 6%, and 7%.

Figure 16A:
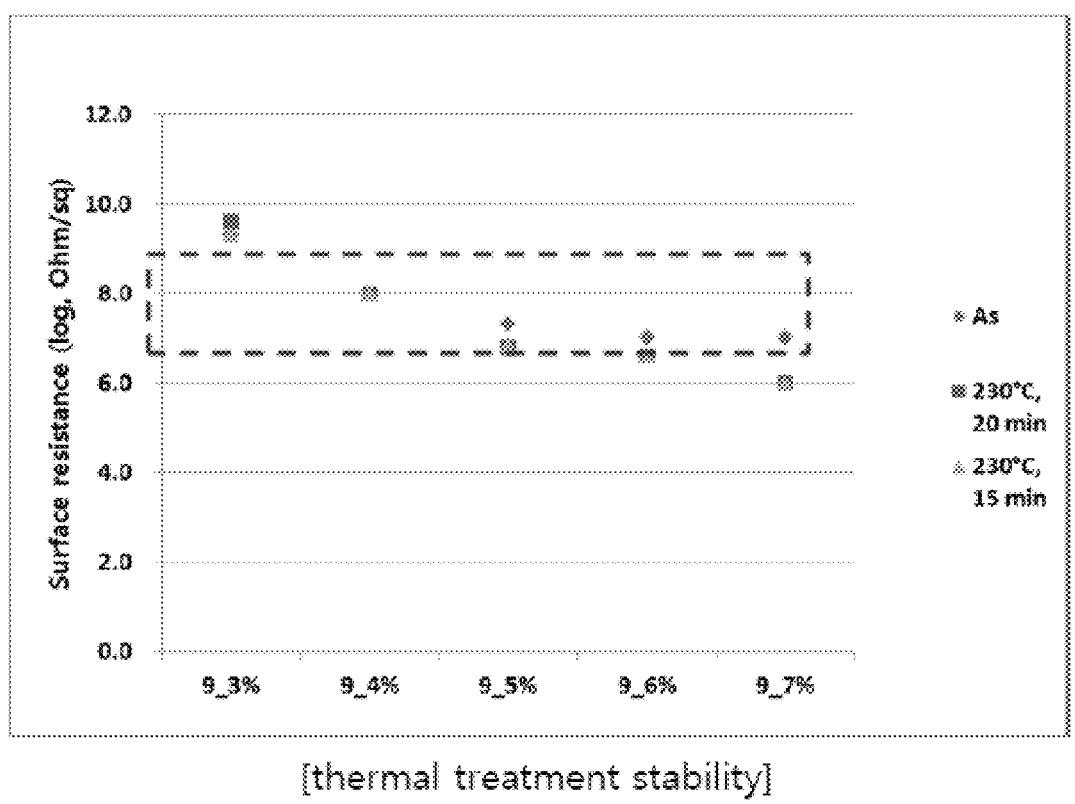
FIGS. 16A-16F are diagrams showing sheet resistances obtained from thermal treatment stability and chemical resistance tests, in an experiment 3 of the present disclosure.
Figure 16B:
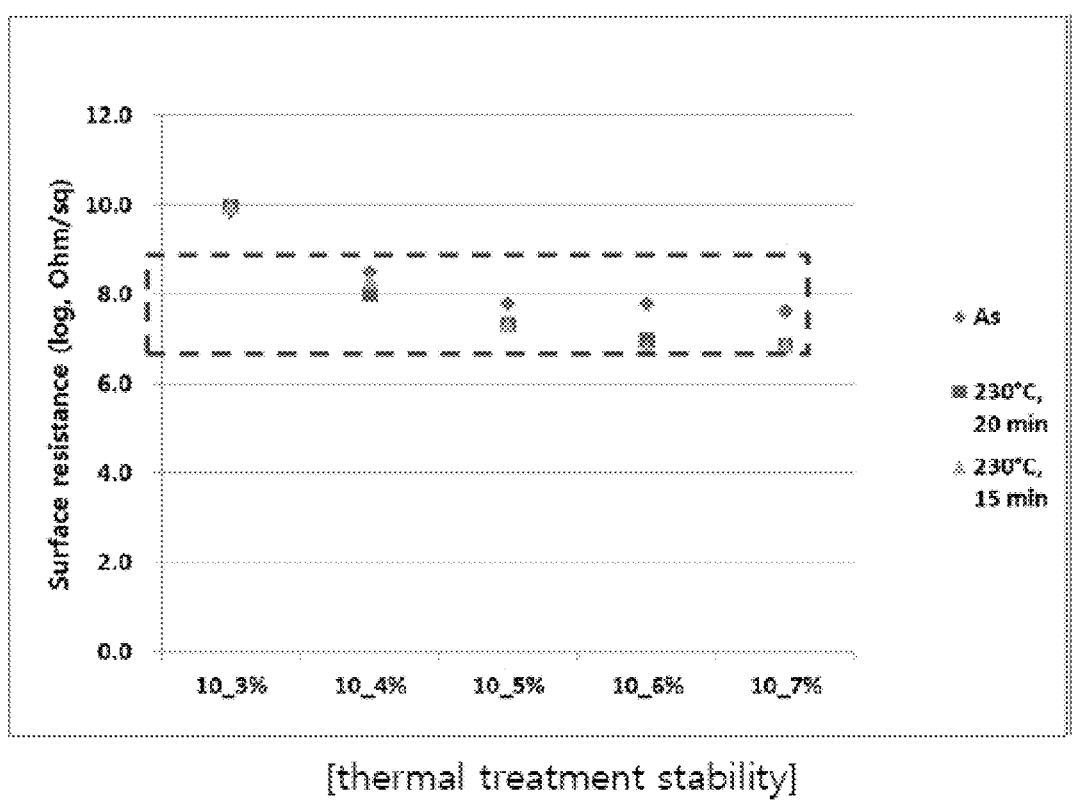
Figure 16C:
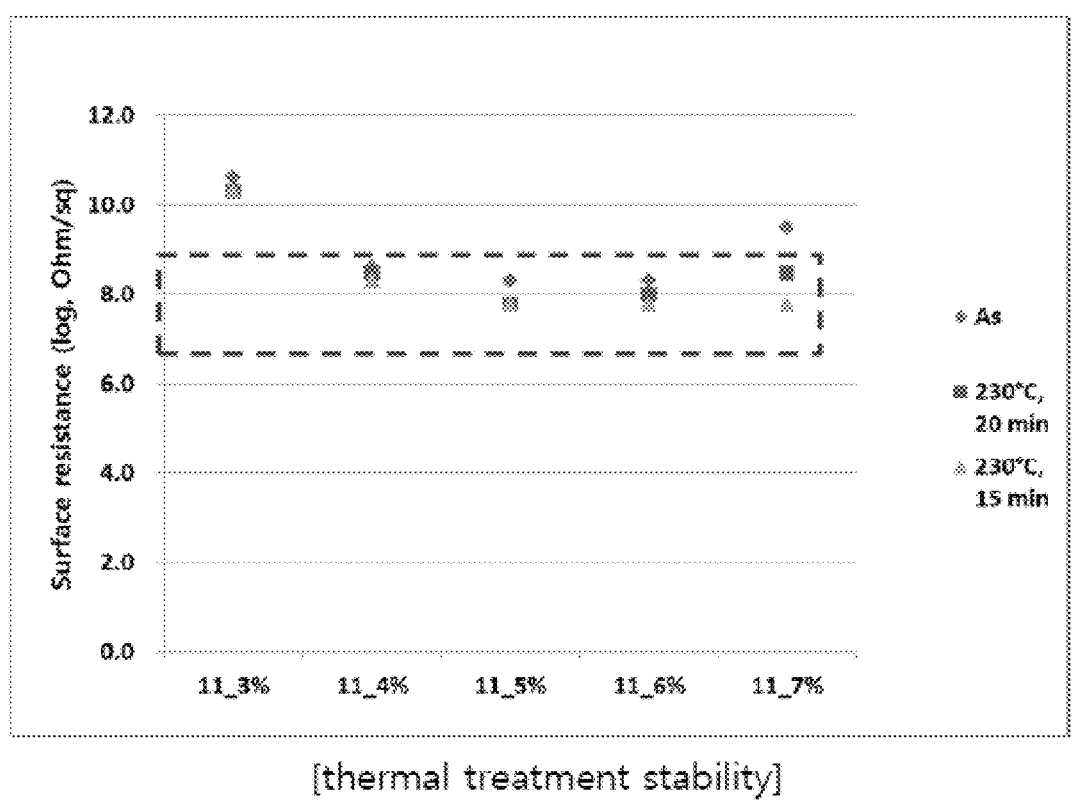
Figure 16D:
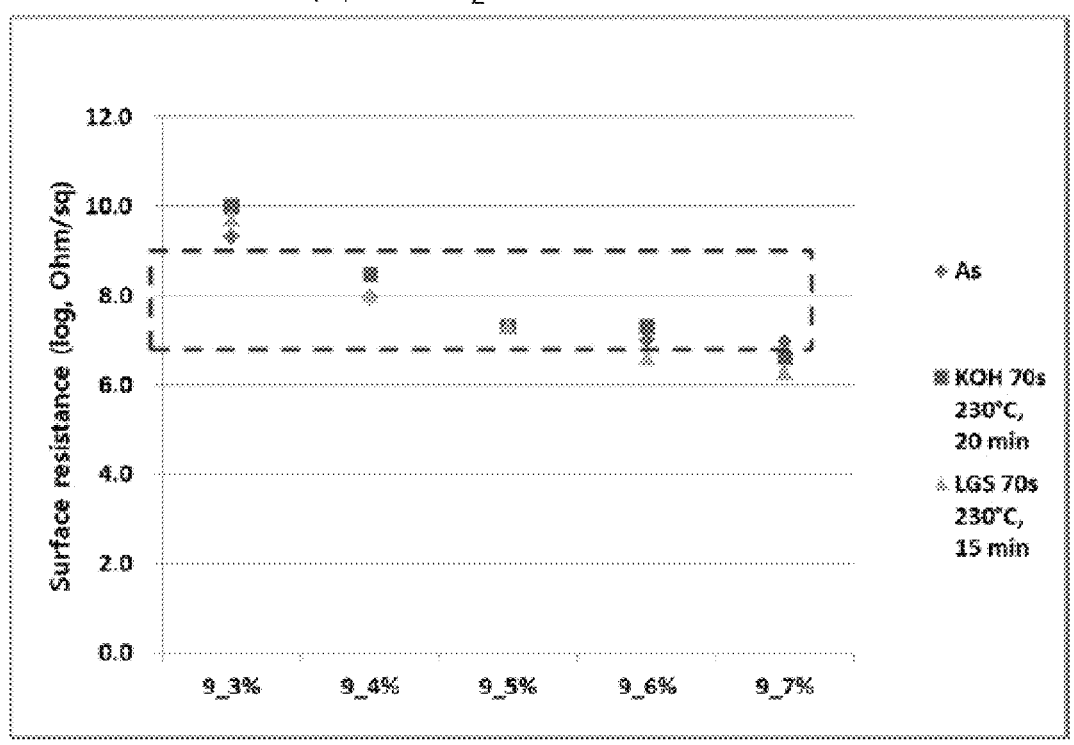
Figure 16E:
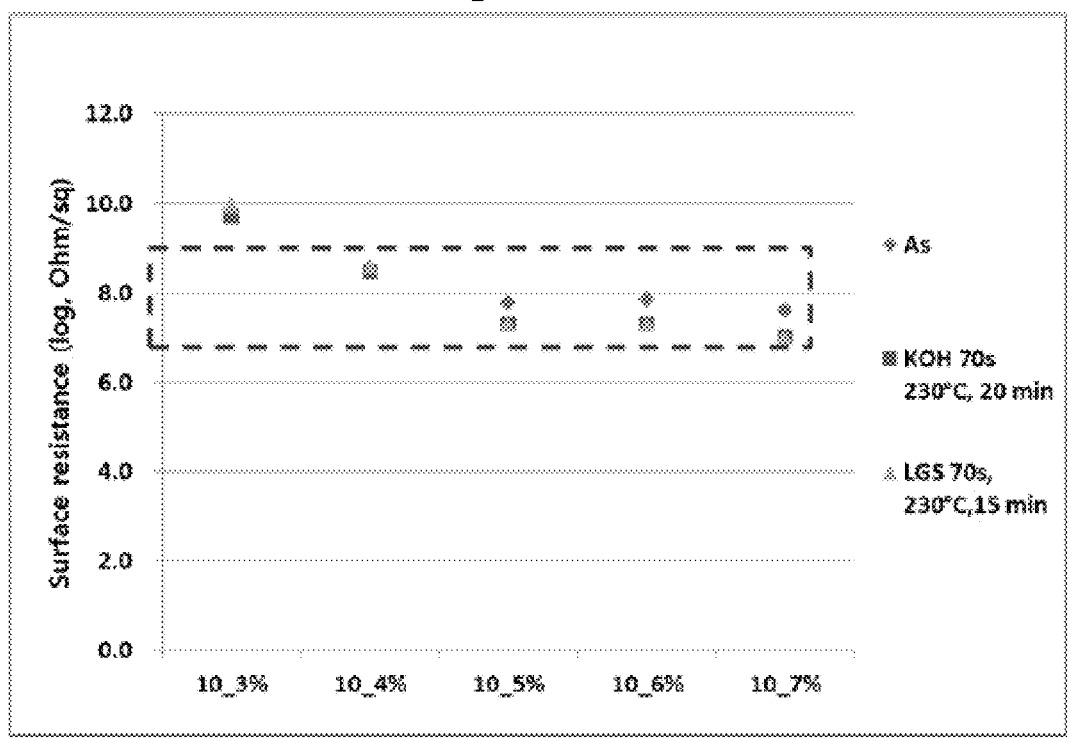
Figure 16F:
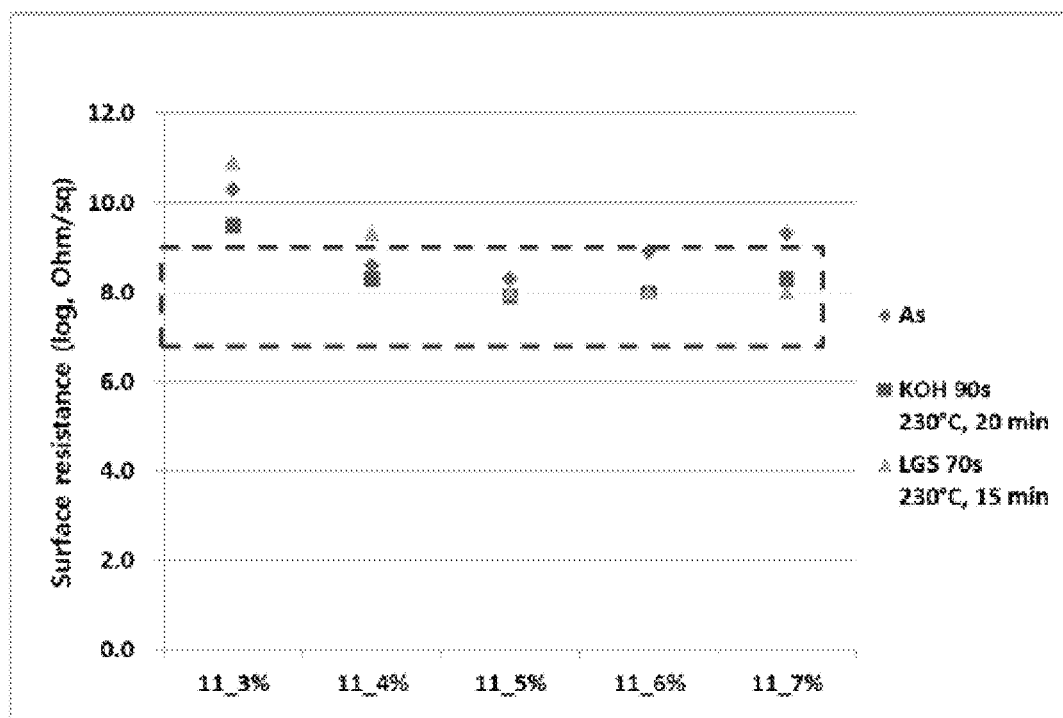

In FIG. 16, the results of the thermal treatment stability test are shown in FIGS. 16A, 16B, and 16C, and the combined results of the thermal treatment stability and chemical resistance tests are shown in FIGS. 16D, 16E, and 16F. Here, the results of the thermal treatment stability test were sheet resistances measured after two thermal treatment processes (230° C., 20 min; 230° C., 15 min), and the combined results of the thermal treatment stability and chemical resistance tests were sheet resistances measured after two thermal treatment processes and two chemical resistance treatment processes (KOH, 90 seconds; LGD-900, 70 seconds).

Figure 17A:
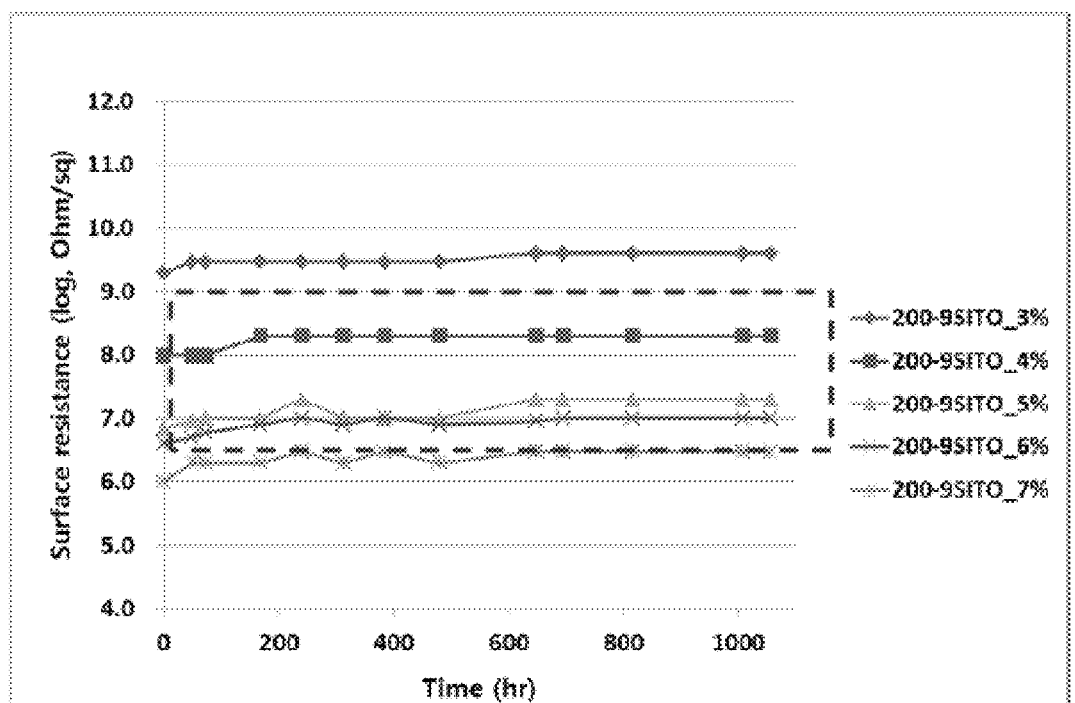
FIGS. 17A-17F are diagrams showing sheet resistances obtained from 6090 reliability and chemical resistance tests, in the experiment 3 of the present disclosure.
Figure 17B:
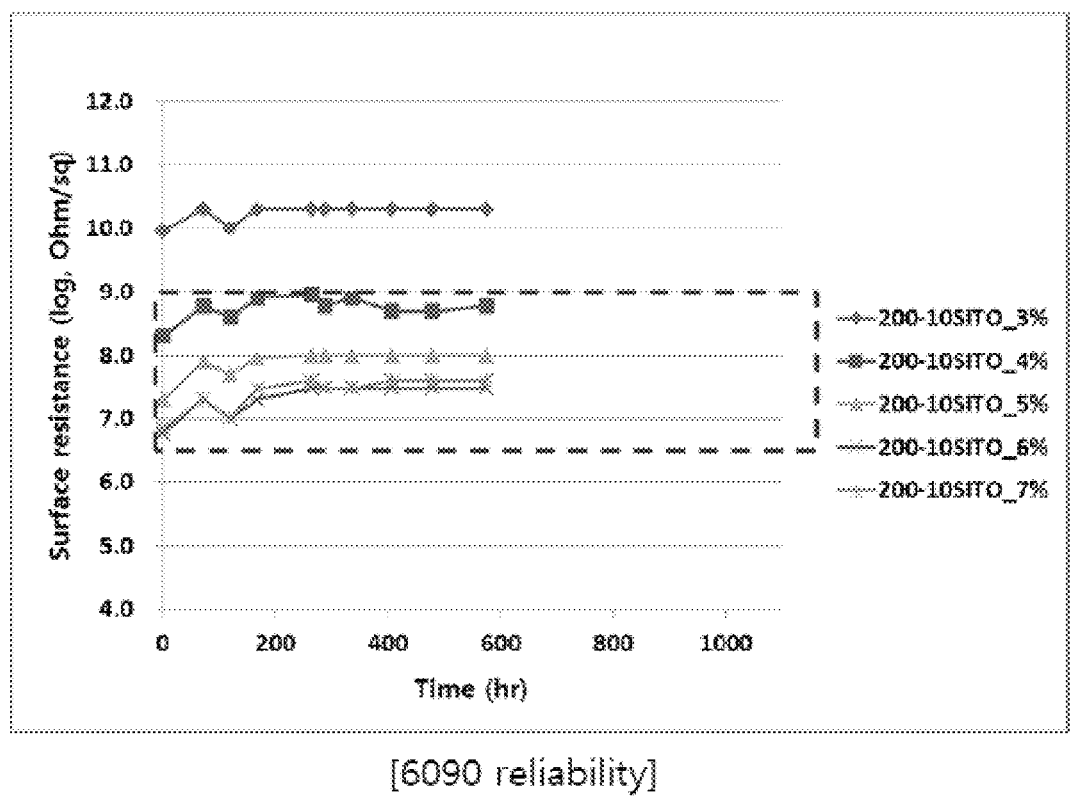
Figure 17C:
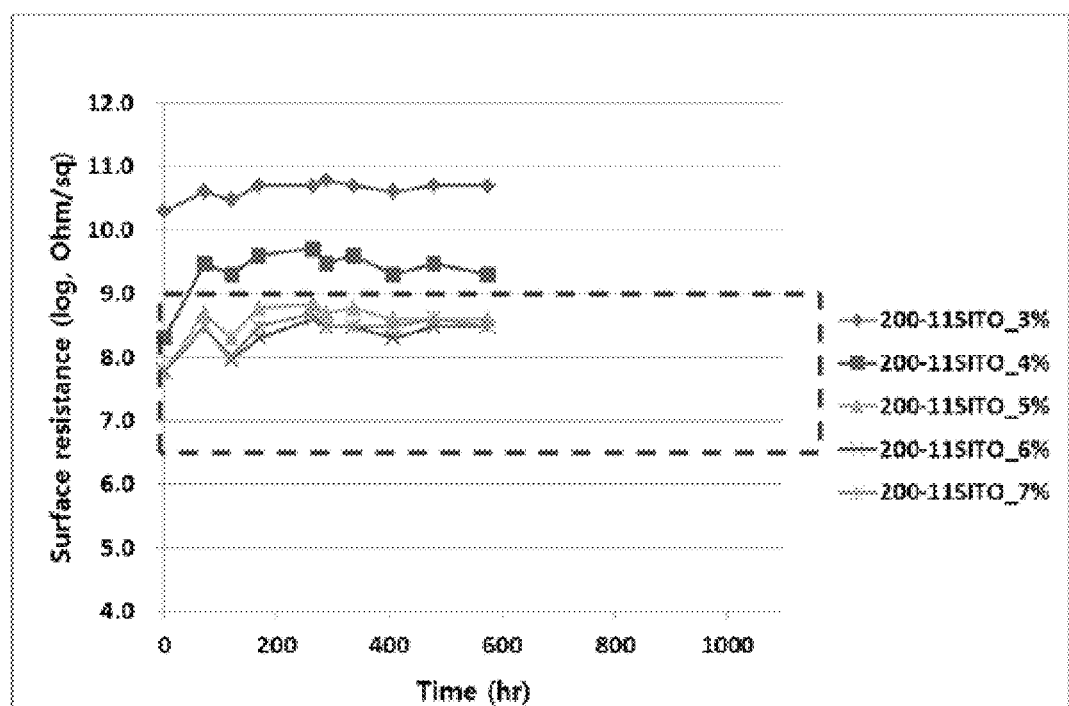
Figure 17D:
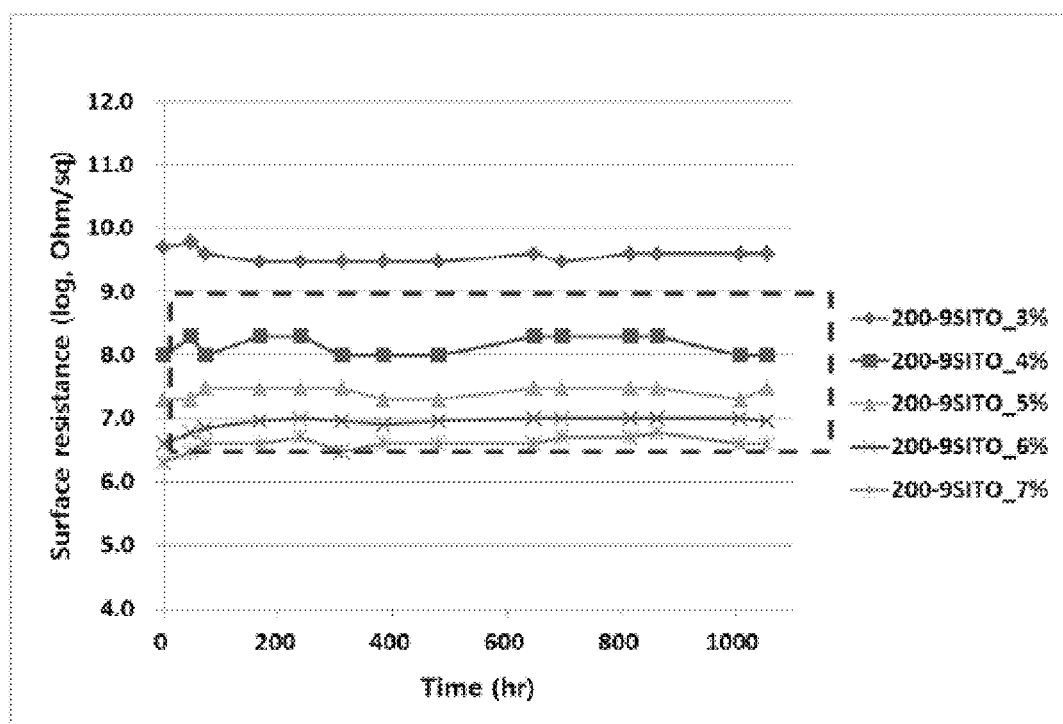
Figure 17E:
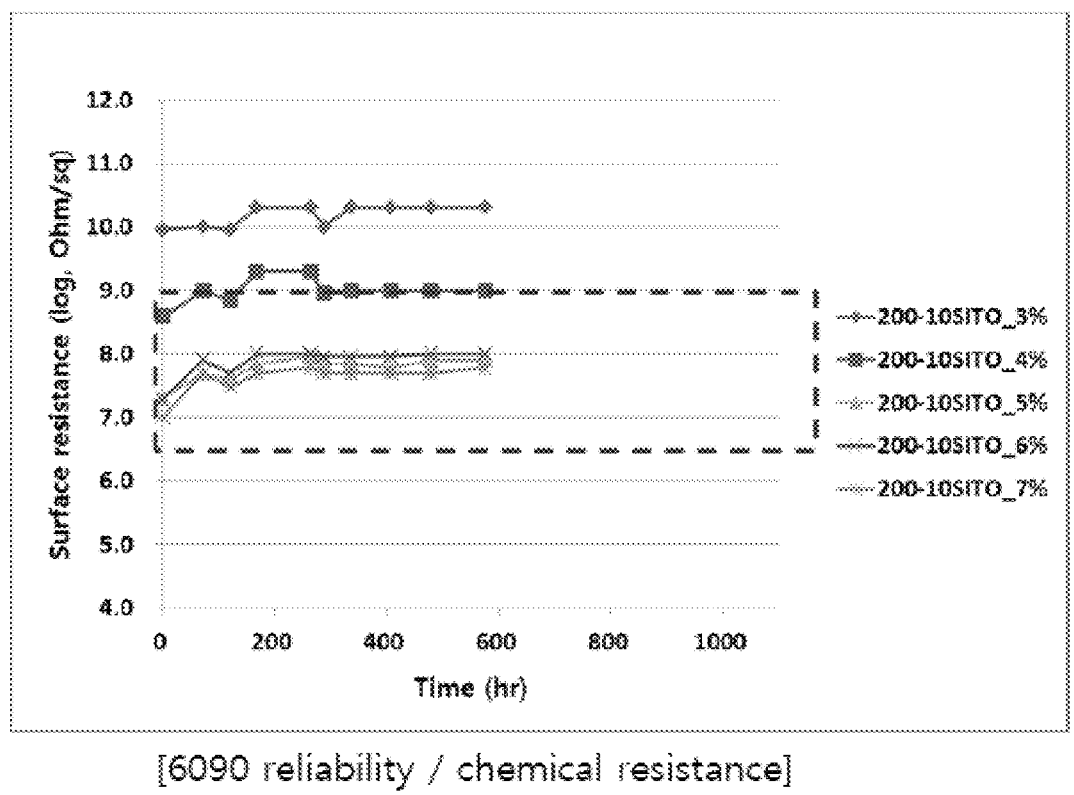
Figure 17F:
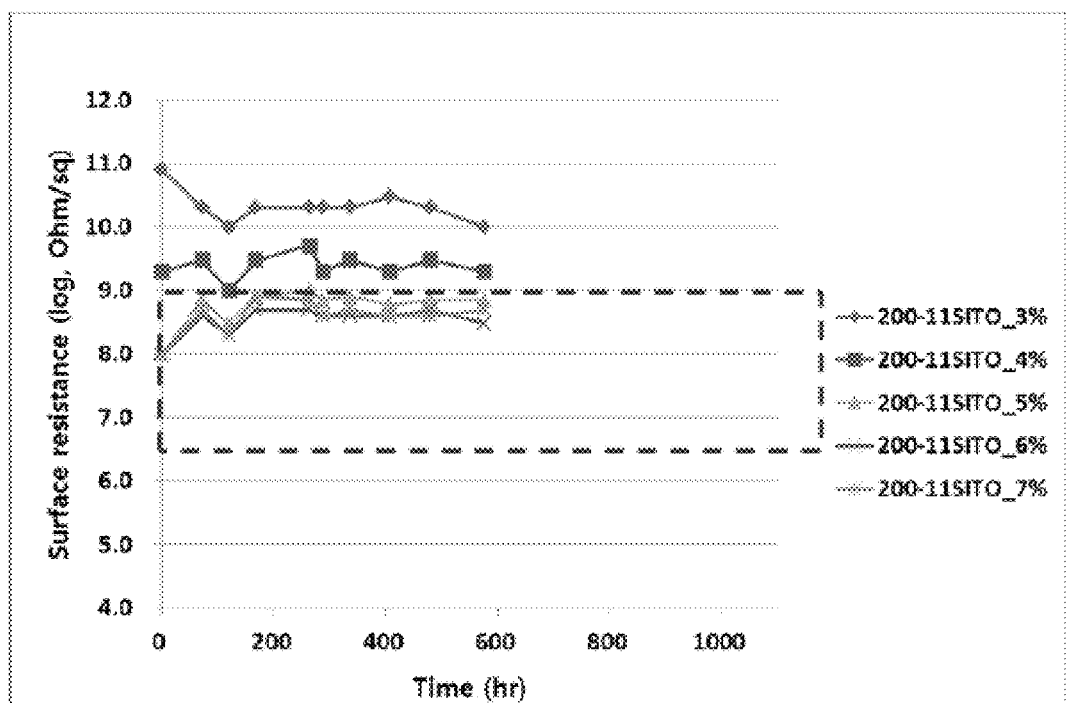

In FIG. 17, the results of the 6090 reliability test are shown in FIGS. 17A, 17B, and 17C, and the combined results of the 6090 reliability and chemical resistance tests are shown in FIGS. 17D, 17E, and 17F. Here, the results of the 6090 reliability test were sheet resistances measured after the 6090 reliability test, and the combined result of the 6090 reliability and chemical resistance tests were sheet resistances measured after the 6090 reliability and chemical resistance treatments.

Referring to FIGS. 16A-16F and FIGS. 17A-17F, the results obtained in the experiment 3 show that, when the $SnO_2$ content ratios were 60 wt % and the dopant content ratios were 9 wt %, 10 wt %, and 11 wt %, it is possible to secure the proper sheet resistance of $10^{6.5}$ to $10^9$ $\Omega$/sq by adjusting the oxygen partial pressure. In detail, as the content ratio of $SiO_2$ increases, the sheet resistance increases, and even in such cases, by increasing the oxygen partial pressure, it may be possible to secure the proper sheet resistance, when the content ratio of $SiO_2$ increases.

The chemical resistance treatment led to a very small change in sheet resistance, and this means that the sheet resistance property before the chemical resistance treatment was substantially equivalent to that after the chemical resistance treatment.

The following Tables 7 and 8 show transmittances of the samples in the present experiment 3, measured from the reliability test and the chemical resistance test.

TABLE 7

| | 60SITO | | | | |
|---|---|---|---|---|---|
| $O_2$ pressure | 3% | 4% | 5% | 6% | 7% |
| Avg(380~760 nm) | 97.50 | 97.66 | 97.43 | 98.09 | 98.28 |
| at 550 nm | 98.17 | 98.25 | 97.92 | 98.48 | 98.67 |

TABLE 8

| | 60SITO | | | | |
|---|---|---|---|---|---|
| $O_2$ pressure | 3% | 4% | 5% | 6% | 7% |
| Avg(380~760 nm) | 97.25 | 97.43 | 97.87 | 98.05 | 98.09 |
| at 550 nm | 97.82 | 97.89 | 98.21 | 98.38 | 98.31 |

Table 7 and Table 8 show transmittances of samples having a $SnO_2$ content ratio of 60 wt %, measured in the reliability test and the chemical resistance test, respectively.

Referring to these results, the samples had transmittances of 97% or higher, which were in the proper transmittance range, and this means that the samples in the present experiment 3 could have sufficient reliability and chemical resistance.

The results of the experiments show that it is possible to secure the proper sheet resistance range and the proper transmittance range for the static electricity prevention layer, which is formed on the outer surface of the opposite substrate according to an embodiment of the present invention. Meanwhile, in the experiments, the process condition associated with the oxygen amount in the deposition process of the static electricity prevention layer was represented in terms of the oxygen partial pressure, for convenience's sake, but this condition may be represented in terms of an amount of oxygen. For example, the oxygen flow for the proper sheet resistance and transmittance ranges may be in a range of about 5 sccm to 20 sccm.

As described above, in the touch LCD device of the in-cell structure according to an embodiment of the present disclosure, the static electricity prevention layer, which is formed of a host material including at least one of $In_2O_3$ and $SnO_2$ and a dopant material including at least one of $SiO_2$, $ZrO_2$, $HfO_2$, $Nb_2O_5$, and $Ta_2O_5$, may be formed on the outer surface of the opposite substrate.

Accordingly, it may be possible to effectively secure a sheet resistance of about $10^{6.5}$ $\Omega$/sq to about $10^9$ $\Omega$/sq, which is required to prevent the issues of static electricity and interference with touch-induced capacitance, and to effectively secure a transmittance of about 97% or higher, which is required to maintain the image brightness to a desired level.

Thus, the opposite substrate can be disposed adjacent to the display surface or the top surface of the liquid crystal panel 100, and thus, the in-cell touch LCD device can be configured to have the non-inverted panel structure.

As a result, it is possible to effectively overcome the problems in the conventional inverted panel structure. For example, it is unnecessary to form an additional inorganic insulating layer for reducing the recognition of reflection by the gate metal in the inverted panel structure. Furthermore, it is unnecessary to provide an expensive polarizing plate having a static electricity prevention function near the display surface, and a typical polarizing plate can be cost-effectively used in the inverted panel structure. In addition, an additional apparatus for inverting the panel is not required.

Furthermore, the static electricity prevention layer may be formed using the existing sputtering system, which is used to form a transparent conductive layer on the outer surface of the opposite substrate, as it is, and thus, there is no additional cost to prepare a new system.

Thus, it may be possible to improve productivity and to reduce fabrication cost.

In the touch LCD device of the in-cell structure according to the present disclosure, the static electricity prevention layer, which is formed of a host material including at least one of $In_2O_3$ and $SnO_2$ and a dopant material including at least one of $SiO_2$, $ZrO_2$, $HfO_2$, $Nb_2O_5$, and $Ta_2O_5$, may be formed on the outer surface of the opposite substrate.

Accordingly, it may be possible to effectively secure a sheet resistance of about $10^{6.5}$ Ω/sq to about $10^9$ Ω/sq, which is required to prevent the issues of static electricity and interference with touch-induced capacitance, and to effectively secure a transmittance of about 97% or higher, which is required to maintain the image brightness to a desired level.

Thus, the opposite substrate can be disposed adjacent to the display surface or the top surface of the liquid crystal panel 100, and thus, the in-cell touch LCD device can be configured to have the non-inverted panel structure.

As a result, it is possible to effectively overcome the problems in the conventional inverted panel structure. For example, it is unnecessary to form an additional inorganic insulating layer for reducing the recognition of reflection by the gate metal in the inverted panel structure. Furthermore, it is unnecessary to provide an expensive polarizing plate having a static electricity prevention function near the display surface, and a typical polarizing plate can be cost-effectively used in the inverted panel structure. In addition, an additional apparatus for inverting the panel is not required.

Furthermore, the static electricity prevention layer may be formed using the existing sputtering system, which is used to form a transparent conductive layer on the outer surface of the opposite substrate, as it is, and thus, there is no additional cost to prepare a new system.

Thus, it may be possible to improve productivity and to reduce fabrication cost.

It will be apparent to those skilled in the art that various modifications and variations can be made in a display device of the present disclosure without departing from the sprit or scope of the disclosure. Thus, it is intended that the present disclosure covers the modifications and variations of this disclosure provided they come within the scope of the appended claims and their equivalents.

What is claimed is:

1. A liquid crystal display device, comprising:
an array substrate including a first substrate, which is placed adjacent to a backlight, and a thin film transistor and a touch electrode which are provided on the first substrate; and
an opposite substrate including a second substrate, which faces the first substrate with a liquid crystal layer interposed therebetween, and a static electricity prevention layer which is deposited on an outer surface of the second substrate,
wherein the static electricity prevention layer is formed of a host material containing at least one of $In_2O_3$ and $SnO_2$ and a dopant material containing at least one of $ZrO_2$, $HfO_2$, $Nb_2O_5$, and $Ta_2O_5$ or formed of a host material containing $In_2O_3$ and $SnO_2$ and a dopant material containing $SiO_2$ and has sheet resistance of $10^{6.5}$ Ω/sq to $10^9$ Ω/sq, and
wherein the array substrate further includes a touch line connected to the touch electrode and a data line connected to the thin film transistor and extending in a first direction, and the touch line has a narrower width than the touch electrode along a second direction perpendicular to the first direction and is disposed between the touch electrode and the data line.

2. The liquid crystal display device of claim 1, wherein a content ratio of the dopant material is in a range of 9 wt % to 15 wt %, and
a content ratio of the host material is in a range of 85 wt % to 91 wt %.

3. The liquid crystal display device of claim 2, wherein, when the host material is one of $In_2O_3$ and $SnO_2$, the content ratio of the dopant material is in a range of 12 wt % to 15 wt % and the content ratio of the host material is in a range of 85 wt % to 88 wt %, and
when the host material is $In_2O_3$ and $SnO_2$, the content ratio of the dopant material is in a range of 9 wt % to 11 wt % and the content ratio of the host material is in a range of 89 wt % to 91 wt %.

4. The liquid crystal display device of claim 3, wherein, when the host material is $In_2O_3$ and $SnO_2$, the content ratio of the $SnO_2$ is in a range of 50 wt % to 70 wt %.

5. The liquid crystal display device of claim 1, wherein a thickness of the static electricity prevention layer is in a range of 100 Å to 300 Å.

6. The liquid crystal display device of claim 1, wherein the static electricity prevention layer has a transmittance of 97% or higher.

7. The liquid crystal display device of claim 1, wherein the opposite substrate comprises:
a column spacer on an inner surface of the second substrate; and
an alignment layer on the column spacer and the inner surface of the second substrate.

8. The liquid crystal display device of claim 7, wherein the column spacer overlaps the touch line and the data line.

9. The liquid crystal display device of claim 1, further comprising:
a polarizing plate attached to a top surface of the static electricity prevention layer; and
a cover window attached to a top surface of the polarizing plate.

10. The liquid crystal display device of claim 1, wherein the array substrate comprises a pixel electrode and a color filter pattern formed in a pixel region, and the color filter pattern is disposed between the touch line and the data line, and
wherein an electric field driving the liquid crystal layer is produced between the pixel electrode and the touch electrode, during an image display period.

11. The liquid crystal display device of claim 1, wherein, when the host material is $In_2O_3$ and $SnO_2$ and the dopant material is $SiO_2$, a content ratio of the $In_2O_3$ is higher than a content ratio of the $SiO_2$ and is lower than a content ratio of the $SnO_2$.

12. A method of fabricating a liquid crystal display device, comprising:
fabricating an array substrate including a first substrate, which is placed adjacent to a backlight, and a thin film transistor and a touch electrode which are provided on the first substrate; and
fabricating an opposite substrate including a second substrate, which faces the first substrate with a liquid crystal layer interposed therebetween, and a static electricity prevention layer which is deposited on an outer surface of the second substrate,
wherein the static electricity prevention layer is formed of a host material containing at least one of $In_2O_3$ and $SnO_2$ and a dopant material containing at least one of $ZrO_2$, $HfO_2$, $Nb_2O_5$, and $Ta_2O_5$ or formed of a host material containing $In_2O_3$ and $SnO_2$ and a dopant material containing $SiO_2$ and has sheet resistance of $10^{6.5}$ Ω/sq to $10^9$ Ω/sq, and
wherein the array substrate further includes a touch line connected to the touch electrode and a data line connected to the thin film transistor and extending in a first direction, and the touch line has a narrower width than the touch electrode along a second direction perpendicular to the first direction and is disposed between the touch electrode and the data line.

13. The method of claim 12, wherein a content ratio of the dopant material is in a range of 9 wt % to 15 wt %, and
a content ratio of the host material is in a range of 85 wt % to 91 wt %.

14. The method of claim 13, wherein, when the host material is one of $In_2O_3$ and $SnO_2$, the content ratio of the dopant material is in a range of 12 wt % to 15 wt % and the content ratio of the host material is in a range of 85 wt % to 88 wt %, and
when the host material is $In_2O_3$ and $SnO_2$, the content ratio of the dopant material is in a range of 9 wt % to 11 wt % and the content ratio of the host material is in a range of 89 wt % to 91 wt %.

15. The method of claim 14, wherein, when the host material is $In_2O_3$ and $SnO_2$, the content ratio of the $SnO_2$ is in a range of 50 wt % to 70 wt %.

16. The method of claim 15, wherein, when the static electricity prevention layer is deposited at a temperature lower than 100° C., the content ratio of $SnO_2$ is in a range of 50 wt % to 60 wt %,
when the static electricity prevention layer is deposited at a temperature of 100° C. or higher, the content ratio of $SnO_2$ is in a range of 60 wt % to 70 wt %.

17. The method of claim 12, wherein a thickness of the static electricity prevention layer is in a range of 100 Å to 300 Å.

18. The method of claim 12, wherein the static electricity prevention layer has a transmittance of 97% or higher.

19. The method of claim 12, further comprising:
attaching a polarizing plate to a top surface of the static electricity prevention layer; and
attaching a cover window to a top surface of the polarizing plate.

20. The method of claim 12, wherein the array substrate comprises a pixel electrode and a color filter pattern formed in a pixel region,
the color filter pattern is disposed between the touch line and the data line, and
an electric field driving the liquid crystal layer is produced between the pixel electrode and the touch electrode, during an image display period.

21. A method of fabricating a liquid crystal display device, comprising:
fabricating an array substrate including a first substrate, which is placed adjacent to a backlight, and a thin film transistor and a touch electrode which are provided on the first substrate; and
fabricating an opposite substrate including a second substrate, which faces the first substrate with a liquid crystal layer interposed therebetween, and a static electricity prevention layer which is deposited on an outer surface of the second substrate,
wherein the static electricity prevention layer is formed of a host material containing at least one of $In_2O_3$ and $SnO_2$ and a dopant material containing at least one of $SiO_2$, $ZrO_2$, $HfO_2$, $Nb_2O_5$, and $Ta_2O_5$ and has sheet resistance of $10^{6.5}$ Ω/sq to $10^9$ Ω/sq, and
wherein the fabricating of the opposite substrate comprises:
depositing the static electricity prevention layer on the outer surface of the second substrate using a sputtering method;
performing a mask process including a developing process to form a column spacer on an inner surface of the second substrate on which the static electricity prevention layer is deposited, and then performing a first thermal treatment process;
performing a cleaning process after the first thermal treatment process;
coating an alignment layer after the cleaning process, and then performing a second thermal treatment process.

22. The method of claim 21, wherein an oxygen flow in a deposition chamber is in a range of 5 sccm to 20 sccm, when the static electricity prevention layer is deposited.

23. The method of claim 22, wherein the sheet resistance of the static electricity prevention layer is in inverse proportion to the oxygen flow in the deposition chamber.

* * * * *